US012375992B2

(12) United States Patent
Salkintzis et al.

(10) Patent No.: US 12,375,992 B2
(45) Date of Patent: Jul. 29, 2025

(54) CALCULATING ROUND TRIP TIME IN A MOBILE COMMUNICATION NETWORK

(71) Applicant: Lenovo (Singapore) PTE. LTD., New Tech Park (SG)

(72) Inventors: Apostolis Salkintzis, Athens (GR); Genadi Velev, Darmstadt (DE); Dimitrios Karampatsis, Ruislip (GB)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days.

(21) Appl. No.: 17/432,075

(22) PCT Filed: Feb. 18, 2019

(86) PCT No.: PCT/EP2019/053923
§ 371 (c)(1),
(2) Date: Aug. 18, 2021

(87) PCT Pub. No.: WO2020/169170
PCT Pub. Date: Aug. 27, 2020

(65) Prior Publication Data
US 2022/0303854 A1 Sep. 22, 2022

(51) Int. Cl.
*H04W 36/26* (2009.01)
*H04L 43/0864* (2022.01)
*H04W 36/00* (2009.01)
*H04W 76/38* (2018.01)

(52) U.S. Cl.
CPC ......... *H04W 36/26* (2013.01); *H04L 43/0864* (2013.01); *H04W 36/0044* (2013.01); *H04W 76/38* (2018.02)

(58) Field of Classification Search
CPC . H04W 36/26; H04W 76/38; H04W 36/0044; H04L 43/0864
See application file for complete search history.

(56) References Cited

U.S. PATENT DOCUMENTS 6,446,028 B1 * 9/2002 Wang ............... H04L 43/00
702/186
11,356,897 B2 * 6/2022 Salkintzis ......... H04W 28/0942
(Continued)

OTHER PUBLICATIONS

International Searching Authority, "Notification of Transmittal of the International Search Report and the Written Opinion of the International Searching Authority, or the Declaration", PCT, Sep. 19, 2019, pp. 1-22.

(Continued)

*Primary Examiner* — Kenny S Lin
(74) *Attorney, Agent, or Firm* — Kunzler Bean & Adamson

(57) ABSTRACT

Apparatuses, methods, and systems are disclosed for measuring Round Trip Time ("RTT"). One apparatus includes a processor and a transceiver that communicates via an access network. The processor establishes a data connection capable of communicating PDUs over the access network and establishes a measurement session via the data connection. The processor stores a first set of parameters for each PDU sent over the data connection and receives a first message via the measurement session. The processor calculates a value based on the first message and the first set of parameters.

19 Claims, 10 Drawing Sheets

(56) References Cited

U.S. PATENT DOCUMENTS

| | | | |
|---|---|---|---|
| 2005/0190698 A1* | 9/2005 | Mangin | H04L 1/1835 370/236 |
| 2007/0081513 A1* | 4/2007 | Torsner | H04L 1/1887 370/469 |
| 2010/0309892 A1* | 12/2010 | Torsner | H04W 28/065 370/336 |
| 2011/0096732 A1* | 4/2011 | Rashid | H04W 8/04 370/329 |
| 2013/0103821 A1* | 4/2013 | Gonia | H04W 24/06 709/224 |
| 2016/0065446 A1* | 3/2016 | Li | H04L 45/121 370/352 |
| 2016/0219024 A1* | 7/2016 | Verzun | H04L 9/0662 |
| 2016/0302096 A1* | 10/2016 | Chari | H04W 40/12 |
| 2019/0059067 A1* | 2/2019 | Lee | H04L 67/141 |
| 2019/0104551 A1* | 4/2019 | Deenoo | H04L 5/0053 |
| 2019/0274178 A1* | 9/2019 | Salkintzis | H04W 76/15 |
| 2020/0178196 A1* | 6/2020 | Wang | H04W 48/18 |
| 2020/0259896 A1* | 8/2020 | Sachs | H04J 3/0667 |
| 2020/0336940 A1* | 10/2020 | Salkintzis | H04W 28/085 |
| 2021/0014734 A1* | 1/2021 | Liu | H04W 28/0942 |

OTHER PUBLICATIONS

Vu Thi Huong Giang et al., "iPATH: Achieving High-Performance End-To-End Paths for Mulit-Homed Mobile Hosts", Communications and Electronics (ICCE), 2010 Third International Conference on IEEE, Aug. 11, 2020, pp. 1-69.

3GPP, "3rd Generation Partnership Project; Technical Specification Group Services and System Aspects; Procedures for the 5G System; Stage 2 (Release 15)", 3GPP TS 23.502 V15.4.0, Dec. 2018, pp. 1-346.

3GPP, "3rd Generation Partnership Project; Technical Specification Group Services and System Aspects; System Architecture for the 5G System; Stage 2 (Release 15)", 3GPP TS 23.501 V15.4.0, Dec. 2018, pp. 1-236.

* cited by examiner

CALCULATING ROUND TRIP TIME IN A MOBILE COMMUNICATION NETWORK

FIELD

The subject matter disclosed herein relates generally to wireless communications and more particularly relates to measuring RTT.

BACKGROUND

The following abbreviations and acronyms are herewith defined, at least some of which are referred to within the following description.

Third Generation Partnership Project ("3GPP"), Fifth-Generation Core ("5GC"), Access and Mobility Management Function ("AMF"), Access Network Performance ("ANP"), Access Point Name ("APN"), Access Stratum ("AS"), Access Traffic Steering, Switching and Splitting ("ATSSS"), Carrier Aggregation ("CA"), Clear Channel Assessment ("CCA"), Control Channel Element ("CCE"), Channel State Information ("CSI"), Common Search Space ("CSS"), Data Network Name ("DNN"), Data Radio Bearer ("DRB"), Differentiated Services Code Point ("DSCP"), Downlink Control Information ("DCI"), Downlink ("DL"), Enhanced Clear Channel Assessment ("eCCA"), Enhanced Mobile Broadband ("eMBB"), Encapsulating Security Payload ("ESP"), Evolved Node-B ("eNB"), Evolved Packet Core ("EPC"), Evolved UMTS Terrestrial Radio Access Network ("E-UTRAN"), European Telecommunications Standards Institute ("ETSI"), Fixed Access Gateway Function ("FAGF"), Fixed Network Residential Gateway ("FN-RG"), Frame Based Equipment ("FBE"), Frequency Division Duplex ("FDD"), Frequency Division Multiple Access ("FDMA"), Generic Routing Encapsulation ("GRE"), Globally Unique Temporary UE Identity ("GUTI"), Hybrid Automatic Repeat Request ("HARQ"), Home Subscriber Server ("HSS"), Internet-of-Things ("IoT"), IP Multimedia Subsystem ("IMS," aka "IP Multimedia Core Network Subsystem"), Internet Protocol ("IP"), Key Performance Indicators ("KPI"), Licensed Assisted Access ("LAA"), Load Based Equipment ("LBE"), Listen-Before-Talk ("LBT"), Long Term Evolution ("LTE"), LTE Advanced ("LTE-A"), Medium Access Control ("MAC"), Multiple Access ("MA"), Modulation Coding Scheme ("MCS"), Machine Type Communication ("MTC"), Massive MTC ("mMTC"), Mobility Management ("MM"), Mobility Management Entity ("MME"), Multiple Input Multiple Output ("MIMO"), Multipath TCP ("MPTCP"), Multi User Shared Access ("MUSA"), Non-Access Stratum ("NAS"), Narrowband ("NB"), Network Function ("NF"), Network Access Identifier ("NAI"), Next Generation (e.g., 5G) Node-B ("gNB"), Next Generation Radio Access Network ("NG-RAN"), New Radio ("NR"), Policy Control & Charging ("PCC"), Policy Control Function ("PCF"), Policy Control and Charging Rules Function ("PCRF"), Packet Data Network ("PDN"), Packet Data Unit ("PDU"), PDN Gateway ("PGW"), Public Land Mobile Network ("PLMN"), Quality of Service ("QoS"), Quadrature Phase Shift Keying ("QPSK"), Registration Area ("RA"), Radio Access Network ("RAN"), Radio Access Technology ("RAT"), Radio Resource Control ("RRC"), Receive ("RX"), Single Network Slice Selection Assistance Information ("S-NSSAI"), Scheduling Request ("SR"), Secure User Plane Location ("SUPL"), Serving Gateway ("SGW"), Session Management Function ("SMF"), Stream Control Transmission Protocol ("SCTP"), System Information Block ("SIB"), Tracking Area ("TA"), Transport Block ("TB"), Transport Block Size ("TBS"), Transmission Control Protocol ("TCP"), Time-Division Duplex ("TDD"), Time Division Multiplex ("TDM"), Transmission and Reception Point ("TRP"), Transmit ("TX"), Trusted WLAN Interworking Function ("TWIF"), Uplink Control Information ("UCI"), Unified Data Management ("UDM"), User Entity/Equipment (Mobile Terminal) ("UE"), Uplink ("UL"), User Plane ("UP"), Universal Mobile Telecommunications System ("UMTS"), Ultra-reliability and Low-latency Communications ("URLLC"), User Datagram Protocol ("UDP"), UE Route Selection Policy ("URSP"), Wireless Local Area Network ("WLAN"), Wireless Local Area Network Selection Policy ("WLANSP"), and Worldwide Interoperability for Microwave Access ("WiMAX").

There are many technologies known for measuring the packet delay in IP communication networks. However, none of them are optimized for 5G NR, where simplicity and efficiency are primary deciding factors. Even the simplest solution based on "Ping/Pong" is not very efficient, given that UEs may consume many radio and battery resources when they apply this solution for an extended period of time.

BRIEF SUMMARY

Methods for measuring RTT are disclosed. Apparatuses and systems also perform the functions of the methods.

A first method for measuring RTT includes establishing a multi-access data connection with a mobile communication network, the multi-access data connection capable of communicating PDUs over a first access network and a second access network. The first method includes establishing a measurement session via the multi-access data connection and storing a first set of parameters for each PDU sent over the multi-access data connection. The first method includes receiving a first message via the measurement session and calculating an RTT value based on the first message and the first set of parameters. The first method includes determining to which of the first and second access networks PDUs of the multi-access data connection are to be sent, said determination based on the calculated RTT value and a set of provisioned traffic steering rules.

A second method for measuring RTT includes establishing a data connection capable of communicating PDUs over a first access network and establishing a measurement session via the data connection. The second method includes storing a first set of parameters for each PDU sent over the data connection and receiving a first message via the measurement session. The second method includes calculating an RTT value based on the first message and the first set of parameters.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
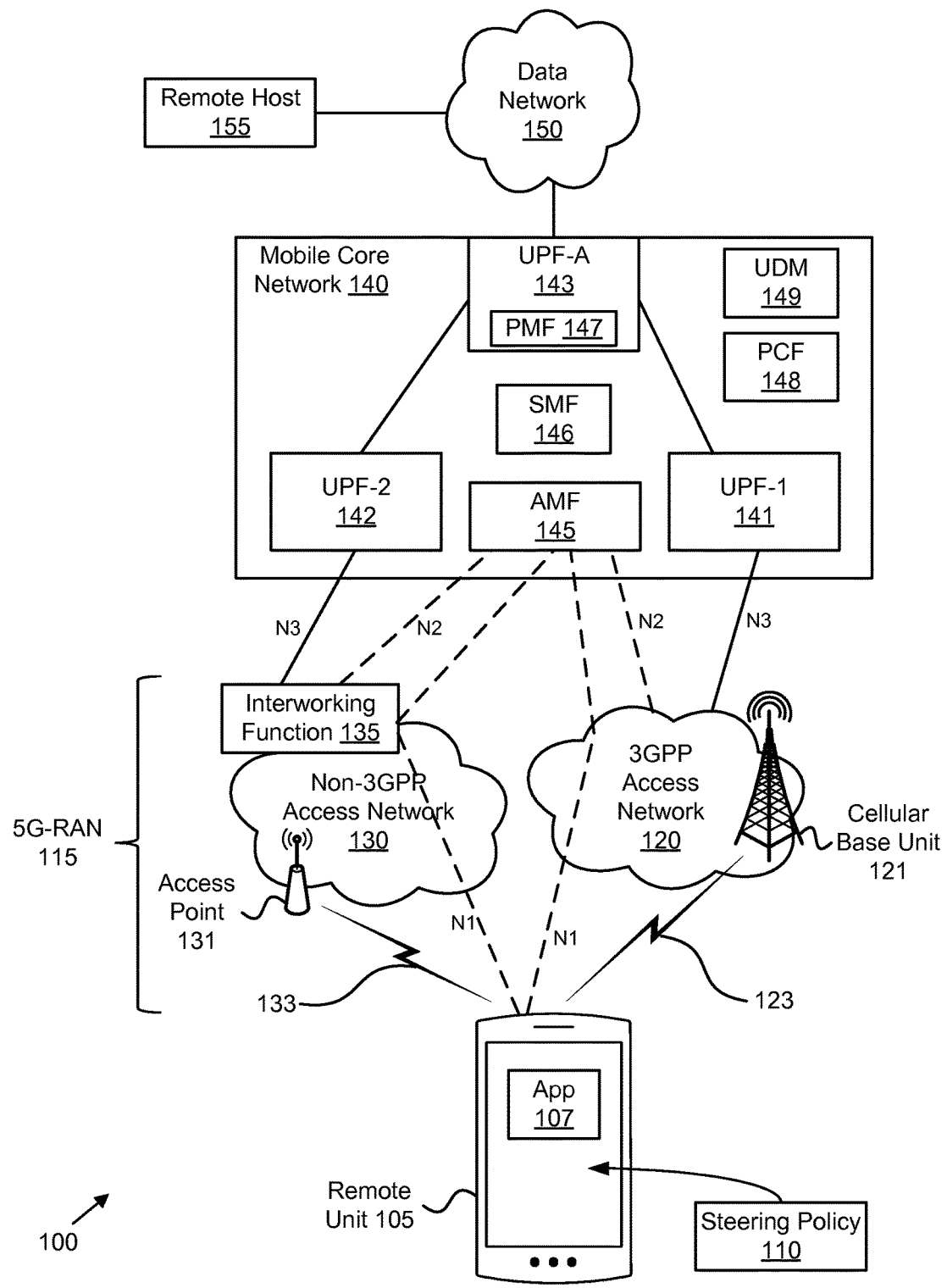
FIG. 1 is a schematic block diagram illustrating one embodiment of a wireless communication system for measuring RTT.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for measuring RTT. UEs may be required to monitor latency of multiple access networks in order to select a "best" access network. In general, there are many technologies known for measuring the packet delay in IP communication networks. However, none of them are suitably efficient for crowded air interfaces.

Also, many known technologies for packet delay measurement are not applicable in 5G because they require some sort of proxy functionality in the 5G core network, which is not available and is unlikely to be introduced. For example, the UPF in 5GC could apply a SOCKS proxy that terminates all UDP and TCP flows of the UE and then creates corresponding outbound flows over the N6 interface. However, the proxy operation introduces a lot of overhead and can have a severe impact on the packet throughput and on the battery consumption of UEs.

A UE may receive measurement assistance information during a MA-PDU Session establishment, which can be used by the UE to contact the Performance Measurement Functionality ("PMF") in the UPF and perform measurements to calculate the RTT over 3GPP access and over non-3GPP access. However, the procedures for performing these measurements between the UE and the PMF are not yet defined.

Note that a proxy functionality is defined in 5GC but only to enable Multi-Path TCP (MPTCP) operation, nothing else. Because of this, the disclosed measurement method in this disclosure is not required when MPTCP is used. However, the disclosed measurement method is needed when the MPTCP protocol is not applied for traffic steering operations.

FIG. 1 depicts a wireless communication system 100 for measuring RTT, according to embodiments of the disclosure. In one embodiment, the wireless communication system 100 includes at least one remote unit 105, a 5G-RAN 115, and a mobile core network 140. The 5G-RAN 115 and the mobile core network form a mobile communication network. The 5G-RAN 115 may be composed of a 3GPP access network 120 containing at least one cellular base unit 121 and/or a non-3GPP access network 130 containing at least one access point 131. The remote unit communicates with the 3GPP access network 120 using 3GPP communication links 123 and communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host 155 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 using the 5G-RAN 115 (e.g., a 3GPP access network 120 and/or a non-3GPP access network 130). The mobile core network 140 then relays traffic between the remote unit 105 and the data network 150 using the PDU session. Note that the remote unit 105 may establish one or more PDU sessions (or other data connections) with the mobile core network 140. As such, the remote unit 105 may have at least one PDU session for communicating with the data network 150. The remote unit 105 may establish additional PDU sessions for communicating with other data network and/or other remote hosts.

The cellular base units 121 may be distributed over a geographic region. In certain embodiments, a cellular base unit 121 may also be referred to as an access terminal, a base, a base station, a Node-B, an eNB, a gNB, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121.

The non-3GPP access networks 130 may be distributed over a geographic region. Each non-3GPP access network 130 may serve a number of remote units 105 with a serving area. Typically, a serving area of the non-3GPP access network 130 is smaller than the serving area of a cellular base unit 121. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking function 135. The interworking function 135 provides interworking between the remote unit 105 and the mobile core network 140. In some embodiments, the interworking function 135 is a Non-3GPP Interworking Function ("N3IWF") and, in other embodiments, it is a Trusted Non-3GPP Gateway Function ("TNGF"). The interworking function 135 supports connectivity to the mobile core network 140 via the "N2" and "N3" interfaces, and it relays "N1" signaling between the UE 105 and the AMF 145. As depicted, both the 3GPP access network 120 and the interworking function 135 communicate with the AMF 145 using a "N2" interface. The interworking function 135 also communicates with the first UPF 141 using a "N3" interface, while the 3GPP access network 120 communicates with the second UPF 142 using a "N3" interface. In various embodiments, the interworking function 135 may include an instance of the PMF 147, for example as described below with reference to FIG. 9.

The non-3GPP access network 130 may support three different types of interworking functions 135. A first type ("Type 1") supports connectivity to one or more 5GC networks for UEs which do not support the NAS protocol. A second type ("Type 2") supports connectivity to one or more 5GC networks for UEs which do support the NAS protocol. A third type ("Type 3") supports connectivity to one or more EPC networks using the existing S2a procedures (see 3GPP TS 23.402). Note that a non-3GPP access network 130 may support one, two, or all three types of interworking functions. The different types of interworking functions are discussed in greater detail below, with reference to FIG. 2.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network.

In one embodiment, the mobile core network 140 is a 5G core ("5GC") or the evolved packet core ("EPC"), which may be coupled to a data network (e.g., the data network 150, such as the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs"). Here, the mobile core network 140 includes at least a first UPF ("UPF-1") 141, a second UPF ("UPF-2") 142, and a UPF-Anchor ("UPF-A") 143. In the depicted embodiment, the first UPF 141 serves the non-3GPP access network 130 and the second UPF 142 serves the 3GPP access network 120. The anchor UPF 143 receives UP traffic of both UPF-1 141 and UPF-2 142 and contains a Performance Measurement Functionality ("PMF") 147. The PMF 147 assists the UE (and the UPF-A 143 itself) in taking performance measurements over the two accesses, including latency measurements. Note that in other embodiments, the mobile core network does not contain the UPF-1 141 and UPF-2 142, so that UPF-A 143 directly serves the 3GPP access network 120 and the non-3GPP access network 130.

The mobile core network 140 also includes multiple control plane functions including, but not limited to, an Access and Mobility Management Function ("AMF") 145 that serves both the 3GPP access network 120 and the non-3GPP access network 130, a Session Management Function ("SMF") 146, a Policy Control Function ("PCF") 148, and a Unified Data Management function ("UDM") 149. In certain embodiments, the mobile core network 140 may also include an Authentication Server Function ("AUSF"), a Network Repository Function ("NRF") (used by the various NFs to discover and communicate with each other over APIs), or other NFs defined for the 5GC.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

In various embodiments, the mobile core network 140 supports different types of mobile data connections and different types of network slices, wherein each mobile data connection utilizes a specific network slice. The different network slices are not shown in FIG. 1 for ease of illustration, but their support is assumed.

In many scenarios, where communication latency is important, the policy rules (e.g., of steering policy 110) may indicate that specific traffic should be routed according to a latency-dependent condition. In one example, the traffic steering rules in the remote unit 105 may indicate: "Route traffic to Remote Host over 3GPP access, if Latency over 3GPP access <20 ms". In another example, or the traffic steering rules in the remote unit 105 may indicate: "Route IMS voice traffic to the access with the smallest Latency".

To enforce such policy rules, the remote unit 105 measures the latency over 3GPP access and the latency over non-3GPP access. In certain embodiments, the UPF-A 143 may measure the latency over 3GPP access and the latency over non-3GPP access, in order to decide how to route the DL traffic in compliance with the policy rules. In other embodiments, one of the UE 205 and the UPF-A 143 may report to the other the latency over 3GPP access and the latency over non-3GPP access, with the assumption of strong correlation between uplink latencies and downlink latencies.

In certain embodiments, the remote unit 105 may occasionally send "Ping" requests to PMF over a specific access network and trigger the PMF to send back "Pong" responses over the same access. This way the remote unit 105 may calculate a Round Trip Time (RTT) over each access network, which is tightly associated with the latency of each access network. However, sending frequent "Ping" requests (e.g., once every 5-10 sec) from the remote unit 105 to PMF 147 consumes lot of radio, network, and battery resources. Furthermore, it creates additional traffic, which can increase congestion and can result to much higher latency values.

To avoid sending, or considerably minimize, the "Ping" requests, the remote unit 105 tracks information of packets it sends (e.g., PDUs on a PDU session) and uses an acknowledgement message from the PMF 147 to measure access latency, thus improving the efficiency of the measurement process.

Figure 2A:
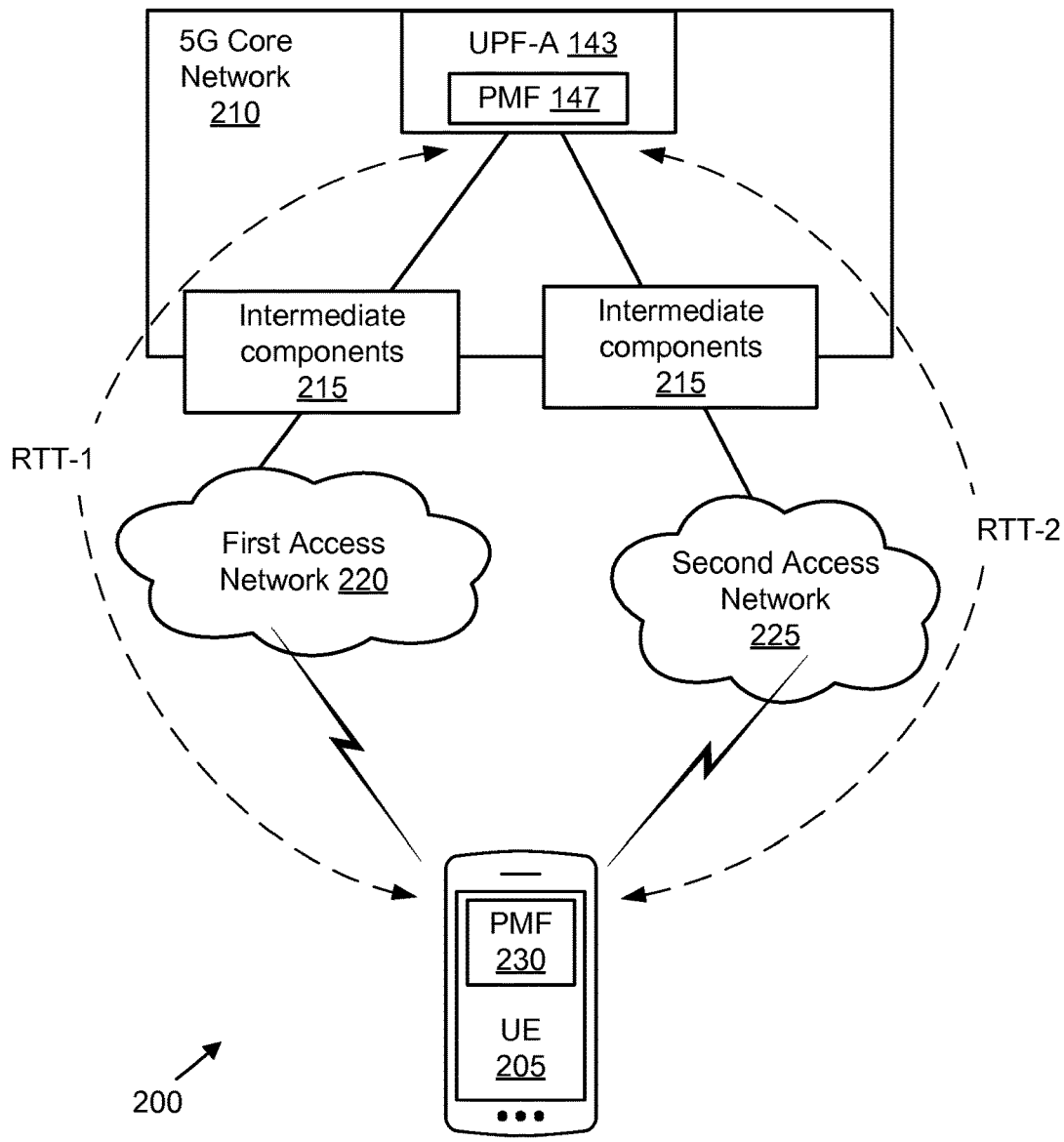
FIG. 2A is a block diagram illustrating one embodiment of a network architecture for measuring RTT.

FIG. 2A depicts a network architecture 200 for measuring RTT, according to embodiments of the disclosure. The network architecture 200 includes a UE 205, a 5G core network 210, a first access network 220 and a second access network 225. The 5G core network 210 includes the UPF-A 143 (containing a PMF 147) and intermediate components 215. In various embodiments, the UE 205 may include a PMF instance, here the PMF 230.

As depicted, the UE 205 may establish a multi-access data connection (e.g., a multi-access PDU ("MA-PDU") session). Traffic of the multi-access data connection exchanged between the UE 205 and a remote host may either be distributed over both access networks, or may be sent on the "best" access only, e.g. on the access characterized by the less latency. In the uplink ("UL") direction, the UE 205 decides how to distribute the traffic across the two accesses based on UE traffic steering rules (e.g., ATSSS rules) provided by the network. Similarly, in the downlink ("DL") direction, the UPF-A 143 at the edge of the 5G Core ("5GC") network 210 decides how to distribute the traffic across to the two accesses based on UPF-A traffic steering rules. Here, one or more of the traffic steering rules may indicate that the latency (e.g., RTT) of the first and second access networks 220-225 is to be used for deciding how to steer specific data traffic.

Figure 2B:
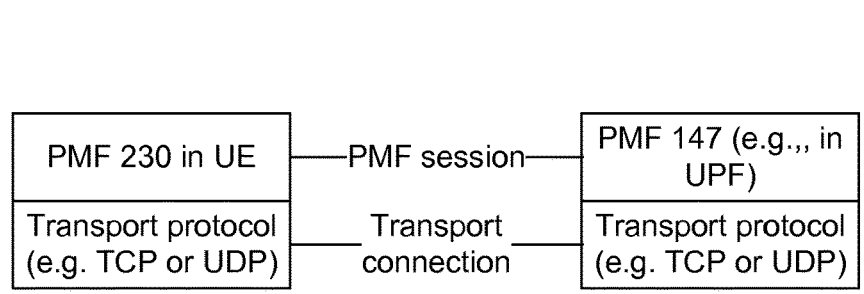
FIG. 2B is a diagram illustrating one example of a PMF session.

FIG. 2B depicts a PMF session 250, according to embodiments of the disclosure. In various embodiments, the PMF session 250 is established between a PMF in the UE (e.g., the PMF 230) and a PMF in the network (e.g., PMF 147). The PMF session 250 is established by using the Measurement Assistance information received by the UE 205. In one example, the PMF session 250 is established over TCP and is initiated by the UE 205 sending a TCP connection request (a TCP SYN segment) to the IP address and port of the PMF 147. In another example, the PMF session 250 is established over UDP, and is initiated by the UE 205 sending a special message (here referred to as a "PMF-Start Request" message) to the IP address and port of the PMF 147. In this case, the PMF 147 responds with a "PMF-Start Accept" or with a "PMF-Start Reject" message.

Figure 3:
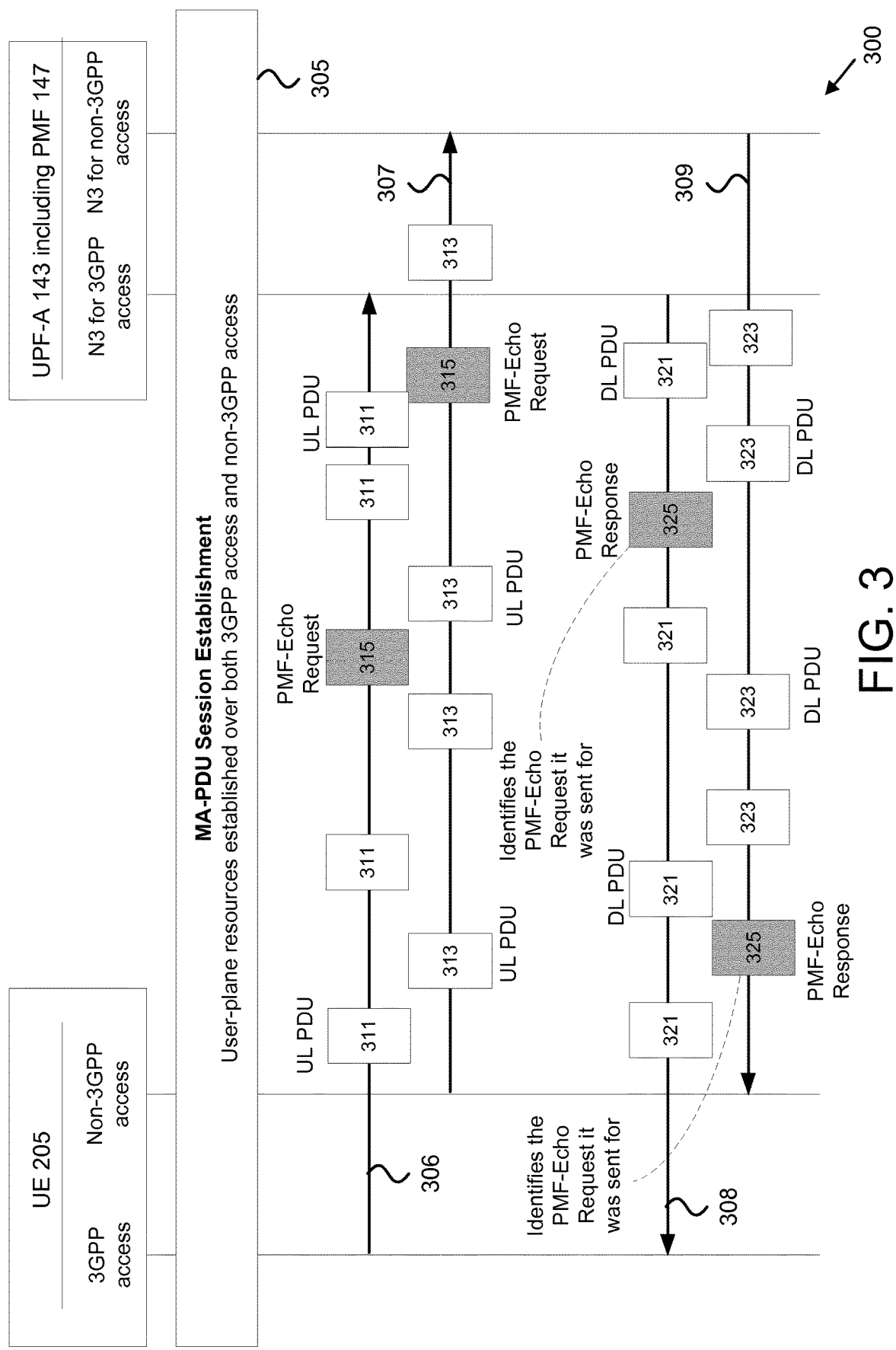
FIG. 3 is a block diagram illustrating one embodiment of a procedure for measuring RTT.

FIG. 3 depicts a first procedure 300 for measuring RTT of an access network, according to embodiments of the disclosure. In the first procedure 300, the UE 205 occasionally sends PMF-Echo Request messages 315 over both 3GPP access (e.g., 3GPP uplink 306) and non-3GPP access (e.g., non-3GPP uplink 307). As depicted, the PMF-Echo Request messages 315 are multiplexed with the UL PDUs 311 on the 3GPP access in the uplink 306. Similarly, the PMF-Echo Request messages 315 are multiplexed with the UL PDUs 313 on the non-3GPP access in the uplink 307. The PMF 147 in the UPF-A 143 sends a PMF-Echo Response for each received PMF-Echo Request. Here, the PMF-Echo Request is a type of 'ping' message and the PMF-Echo Response is a 'gong' message send in response to the ping. By comparing transmission and reception times of the PMF-Echo messages, the UE 205 is able to measure latency on an access network.

The first procedure 300 begins with the establishment of a data connection, here MA-PDU session establishment, where user plane resources are established over both 3GPP access network and non-3GPP access network, provided the UE 205 is registered to 5GC over both access networks (see block 305). In addition, the UE 205 receives ATSSS rules (i.e. traffic steering rules that indicate how UL traffic should distributed across the two accesses) and Measurement Assistance information, that indicates how the UE 205 can establish measurement sessions with the PMF 147 in the network (e.g. it includes the IP address of PMF 147, the protocol/port to use, etc.).

Next, the UE 205 decides to establish a communication session with the PMF 147 (called PMF session), in order to obtain measurements associated with each access network. The UE 205 may be triggered to establish this PMF session by the received ATSSS rules, e.g. because an ATSSS rule contains a latency-dependent condition, such as "Route IMS voice traffic to the access with the smallest Latency". As discussed above, the PMF session may be established over TCP or UDP.

The UE 205 starts sending uplink (UL) PDUs via the MA-PDU Session. These PDUs typically carry data generated by one or more applications 107 in the UE 205, e.g. data of an application in the UE that communicates with the Remote Host 155 shown in FIG. 1. In certain embodiments, the UL PDUs are initially distributed over both accesses until RTT measurements are made. Note that the UE 205 does not add any additional information in these PDUs, so they are transmitted without any additional overhead or other marking.

The UE 205 occasionally (e.g. once every 10 s) sends a PMF-Echo Request message to PMF 147 over an access network, which triggers the PMF 147 to immediately respond with a PMF-Echo Response message over the same access network. Here, each PMF-Echo Response message 325 carries information that identifies the associated PMF-Echo Request message 315. For each PMF-Echo Request sent, the UE 205 stores the time it was transmitted (Tx time or "TxT") and, when the PMF-Echo Response is received, the UE 205 calculates the RTT for this PMF-Echo Request message.

The UE 205 may also calculate an average RTT for a specific access network by averaging the RTT of all (or of the last N) PMF-Echo Request messages sent on this access network. The frequency at which the UE 205 sends a PMF-Echo Request message can be configured in the UE 205. For example, it may be part of the measurement assistance information that the network provides to UE 205. In some embodiments, the PMF-Echo Request messages are sent on a default QoS flow. In certain embodiments, the PMF-Echo Request messages may be sent on every QoS flow. In such embodiments, the UE 205 calculates an average RTT per QoS flow.

Note that the PMF-Echo Request messages and the uplink (UL) PDUs sent by the UE 205 share the same uplink user-plane resources. Similarly, the PMF-Echo Response messages and the downlink (DL) PDUs sent by the UPF-A 143 share the same downlink user-plane resources. In the downlink direction (not shown in FIG. 3), the PMF 147 may perform the same procedure to measure RTT, e.g., the PMF 147 may occasionally send a PMF-Echo Request message to UE 205, which responds with a PMF-Echo Response.

Figure 4:
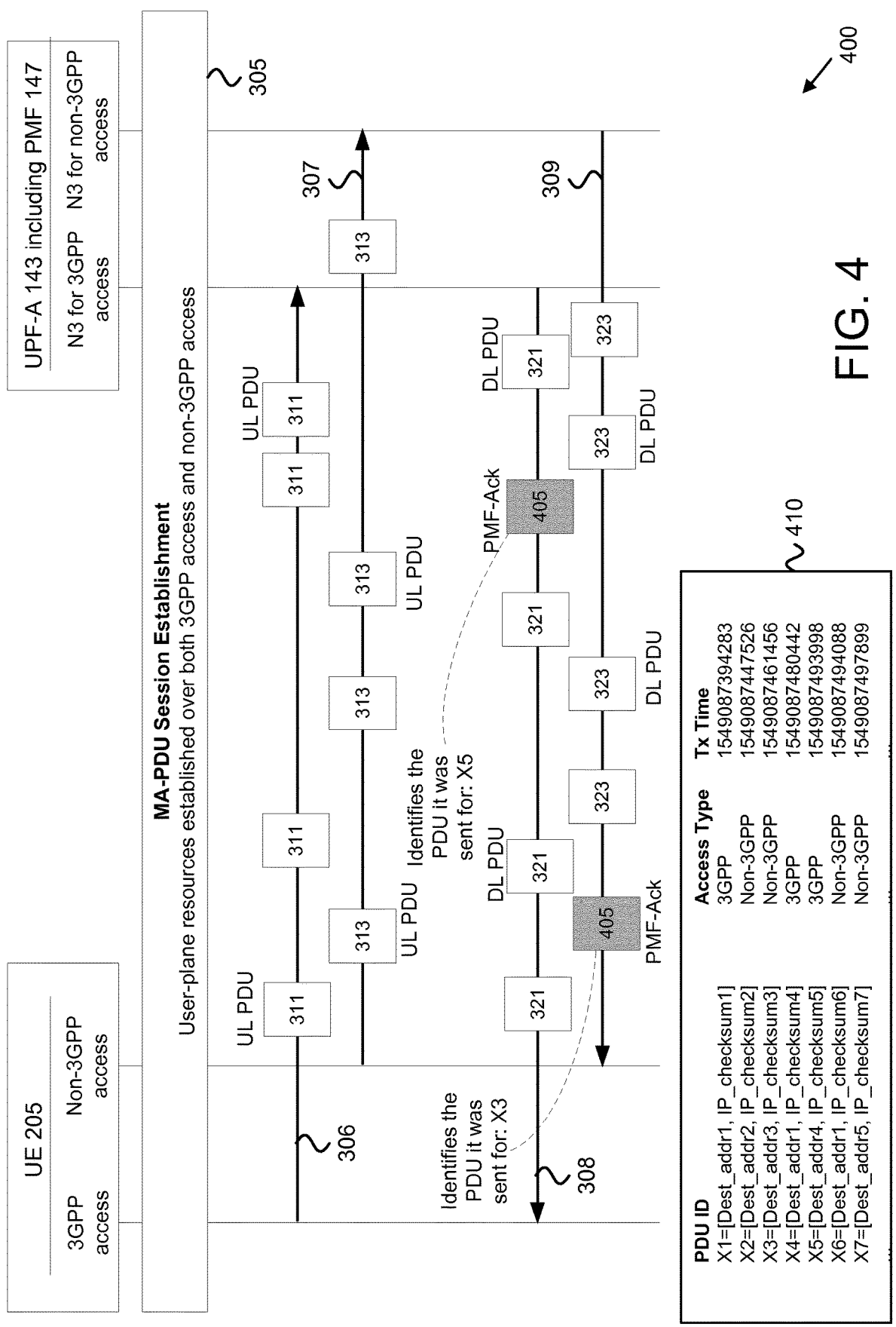
FIG. 4 is a block diagram illustrating another embodiment of a procedure for measuring RTT.

FIG. 4 depicts a second procedure 400 for measuring RTT of an access network, according to embodiments of the disclosure. In the second procedure 400, the UE 205 stores PDU parameters in a "UE transmission table" 410 and the UPF 143 (e.g., PMF 147) occasionally sends PMF-Ack messages 405 over both 3GPP access (e.g., 3GPP downlink 308) and non-3GPP access (e.g., non-3GPP downlink 309). For each UL PDU transmitted by the UE, the PDU parameters may include a) the time it was transmitted (TxT); b) the access type it was transmitted on; and c) a PDU ID (e.g., the checksum in the header of this UL PDU).

The PMF-Ack messages 405 include a PDU ID of an UL PDU, which the UE 205 uses to calculate the RTT. As depicted, the PMF-Ack messages 405 are multiplexed with the DL PDUs 321 on the 3GPP access in the downlink 308. Similarly, the PMF-Ack messages 405 are multiplexed with the UL PDUs 323 on the non-3GPP access in the downlink 309.

The second procedure 400 begins with the UE 205 establishing a data connection, here a Multi-Access PDU ("MA-PDU") Session. During this establishment procedure, user-plane resources are established over both 3GPP access network and non-3GPP access network, provided the UE 205 is registered to 5GC over both access networks (see block 305). In addition, the UE 205 may receive ATSSS rules (i.e. traffic steering rules that indicate how UL traffic should distributed across the two accesses) and Measurement Assistance information, that indicates how the UE 205 is to establish measurement sessions with the PMF 147 in the network (e.g., it includes the IP address of PMF 147, the protocol/port to use, etc.)

Next, the UE 205 decides to establish a communication session with the PMF 147 (called PMF session), in order to obtain measurements associated with each access network. The UE 205 may be triggered to establish this PMF session by the received ATSSS rules, e.g. because an ATSSS rule contains a latency-dependent condition, such as "Route IMS voice traffic to the access with the smallest Latency."

As discussed above, the PMF session may be established by using the Measurement Assistance information received by the UE 205. In one example, the PMF session is established over TCP and is initiated by the UE sending a TCP connection request (a TCP SYN segment) to the IP address and port of PMF. In another example, the PMF session is established over UDP, and is initiated by the UE sending a special message (e.g. called a "PMF-Start Request" message) to the IP address and port of PMF.

Afterwards, the UE 205 starts sending uplink (UL) PDUs via the MA-PDU Session. These PDUs typically carry data generated by one or more applications 107 in the UE 205, e.g. data of an application in the UE 205 that communicates with the Remote Host 155. The UL PDUs may be initially distributed over both accesses, until RTT values for both accesses are calculated. Note that the UE 205 does not add any additional information in these PDUs, so they are transmitted without any additional overhead or marking.

For each UL PDU sent, the UE stores the following parameters in the UE transmission table 410: a) a PDU Identity ("PDU ID"), which is a unique identifier that distinguishes the PDU over all other PDUs transmitted by the UE within a certain time window (e.g. within 30 seconds); b) an Access Type, which is the access (3GPP or non-3GPP) over which the PDU was transmitted; and c) a Tx Time, which is the time instance when the PDU was sent for transmission.

Note that the Access Type is stored to assist the UE 205 in cleaning up its "UE transmission table" 410, as discussed in greater detail below. When the UE 205 receives an PMF-Ack 405 over 3GPP access, the UE 205 then deletes all entries in the UE transmission table 410 that store information about PDUs that 1) were transmitted over 3GPP access and 2) were transmitted before the PDU associated with the PMF-Ack message 405 (e.g., identified by the PDU ID). This way, the UE 205 deletes information for PDUs that will never be acknowledged by the UPF-A 143, so it does not need to keep this information.

In certain embodiments, the UE Transmission Table 410 may also contain the QoS Flow Identity (QFI), which identifies the QoS Flow that was used for transmitting an UL PDU. This allows to the UE 205 to measure different RTT values, each one for a different QoS flow. For traffic steering decisions, measuring different RTT values for different QoS flows may not be required. It may, however, be useful in determining whether a packet delay budget is met for a certain QoS data Flow.

The UE 205 can derive the PDU ID by using a number of different methods, including the following:

1) If the PDU is an IPv4 packet, then the PDU ID may be composed of the "IP Checksum" contained in the header of the IPv4 packet, or it may be composed of the IP Checksum plus additional header information such as the source/destination IPv4 address, the protocol type, the source/destination port numbers, etc. The additional header information is used to make the PDU ID unique across all PDUs sent in a certain time window (e.g. 30 seconds), in case the IP Checksum alone is not sufficient to provide this uniqueness.

2) If the PDU is an IPv6 packet, then the PDU ID may be composed of the "Transport Checksum" (i.e. the checksum contained in the UDP header, or in the TCP header, or in the SCTP header), or it may be composed of the Transport Checksum plus additional header information such as the source/destination IPv6 address, the protocol type, the source/destination port numbers, etc. Again, the additional header information is used to make the PDU ID unique across all PDUs sent in a certain time window, in case the "Transport Checksum" alone is not sufficient to provide this uniqueness. Note that the IPv6 headers do not normally carry IP checksums as do IPv4 headers, which is why transport checksums may be used for IPv6 packets.

3) If the PDU is an Ethernet frame, then the PDU ID may be composed of the "Frame Check Sequence" ("FCS") contained in the Ethernet frame, or it may be composed of the FCS plus addition header information, such as the source/destination MAC address and the Ethernet type field.

4) Alternatively, instead of composing the PDU ID from the existing information in the PDU headers (as specified above), the UE 205 may create the PDU ID, e.g. by hashing a portion of the PDU data, or by generating another checksum value from the PDU data in a way that makes sure that the created PDU ID will be unique within a certain time window with a very high probability. However, creating the PDU ID for each transmitted PDU, may have a negative impact on the power consumption of the UE 205.

In the depicted UE transmission table 410, the PDUs are IPv4 packets, the PDU ID is denoted as X1, X2, etc. and it is composed of the destination IPv4 address and the IP checksum. The "Tx Time" represents the transmission time of each PDU in Unix Epoch time format.

The PMF 147 in the UPF-A 143 is informed about the UL PDUs received via the established user-plane over 3GPP access and over the non-3GPP access. The PMF 147 may decide to send an PMF-Ack message 405 back to the UE for one of these UL PDUs. In one embodiment, the PMF 147 sends an PMF-Ack message 405 for every received UL PDU to improve RTT accuracy; however, sending this volume of PMF-Ack messages 405 would increase the downlink traffic considerably. Thus, in other embodiments, the PMF 147 sends PMF-Ack messages 405 back to the UE 205 with a certain frequency, e.g. one PMF-Ack every 5 sec, or one PMF-Ack every 100 UL PDUs received.

In the example flow shown in FIG. 4, the PMF 147 decides first to send an PMF-Ack message 405 for an UL PDU received over the non-3GPP access. The PMF 147 derives a PDU ID for this PDU in the same way as derived by the UE 205 and includes the PDU ID in the PMF-Ack message (in this example, the PDU ID X3). Subsequently, the PMF 147 sends the PMF-Ack message 405 to UE 205 via the established PMF session and via non-3GPP access downlink 309.

At a later time, the PMF 147 decides to send a PMF-Ack message 405 for an UL PDU received over the 3GPP access. Again, the PMF 147 derives the PDU ID for this UL PDU using the same methods as the UE 205 and includes the PDU ID in the PMF-Ack message (in this example, the PDU ID X5). The PMF 147 sends the PMF-Ack message 405 to UE 205 via the established PMF session, this time via 3GPP access downlink 308.

When the UE 205 receives a PMF-Ack message 405, it checks its UE transmission table 410 and determines from the stored parameters the transmission time ("TxT") of the PDU ID contained in the PMF-Ack message 405. Then, the UE 205 calculates the RTT for this PDU ID, e.g., RTT= [Time when PMF-Ack was received]−[TxT of PDU].

Additionally, the UE 205 may clean up the UE transmission table 410 by deleting all entries for PDU IDs which are stored before the PDU ID in the PMF-Ack message. This way, the UE 205 essentially deletes information for all PDUs which were not acknowledged by the PMF. In the embodiments of FIG. 4, the UE 205 would delete entry X2 upon receiving the PMF-Ack for UL PDU X3, and would delete entries X1 and X4 upon receiving the PMF-Ack for UL PDU X5.

The above procedure continues, thus, the PMF 147 in the UPF-A 143 occasionally sends PMF-Ack messages 405 to UE 205 via the established PMF session and over 3GPP access or non-3GPP access. Each PMF-Ack message contains a PDU ID, which is used by the UE 205 to update a measured RTT average value for 3GPP access and a measured RTT average for non-3GPP access. These RTT average values are used for changing the traffic steering algorithm in the UE 205 in accordance with the provisioned ATSSS rules. For example, when the UE 205 has the ATSSS rule "Route IMS voice traffic to the access with the smallest Latency", the UE 205 sends all UL PDUs that carry IMS voice to the access with the smallest measured RTT value.

However, if the UE 205 does not send traffic on a first one of the access networks for a certain time period (e.g., because the conditions in the ATSSS rules force the UE 205 to send all UL PDUs to the other access network), then the above RTT measurement method cannot be applied for the first access network, since the UPF-A 143 does not receive any UL PDUs on the first of the access networks.

In this case, the UE 205 may occasionally send small PMF-Echo Request messages 315 to the PMF 147 via the established PMF session and via the first access. The PMF 147 in UPF-A 143 immediately responds to every PMF-Echo Request message 315 with a PMF-Echo Response message 325. The PMF-Echo Response message 325 is different from the PMF-Ack messages 405 as it does not contain a PDU ID. Rather, the PMF-Echo Response message 325 simply acknowledges a previous PMF-Echo Request message 315 that was sent.

Advantageously, the second RTT measurement procedure 400 does not require the use of PMF-Echo Request messages as long as UL PDUs are transmitted. Further, there is no need to mark or otherwise alter the PDUs sent over the user-plane. Therefore, the second RTT measurement procedure 400 can save many radio, network, and battery resources.

Note that FIG. 4 illustrates how RTT measurements can be obtained by the UE 205. However, the UPF-A 143 needs also to obtain RTT measurements in order to adopt its traffic steering algorithm according to the provisioned steering rules in the UPF-A 143. The UPF-A 143 can obtain RTT measurements with one of the following methods:

1) The second procedure 400 can be adapted to the downlink direction, in which case the UPF-A 143 sends DL PDUs to UE 205 over 3GPP access and over non-3GPP access and the UE 205 occasionally sends PMF-Ack messages to PMF 147 in the UPF-A 143 via the established PMF session and over 3GPP access or non-3GPP access. Here, the UPF-A 143 maintains a "UPF transmission table" with PDU IDs, access types, transmit times, etc. This way, the PMF 147 in the UPF-A 143 can calculate its own RTT values for 3GPP access and non-3GPP access.

2) Alternatively, instead of the UE 205 periodically sending PMF-Ack messages to PMF 147, which can be costly in terms of battery consumption and network resources, the UE 205 may simply send to PMF 147 its calculated RTT values for 3GPP access and for non-3GPP access. In certain embodiments, the UE 205 sends an updated RTT value to PMF 147 only when the RTT value changes, e.g., +/−10% over the previous RTT value. Thus, in situations when the RTT remains relatively stable, the UE 205 would need to provide an updated RTT value to PMF 147 very infrequently.

Figure 5:
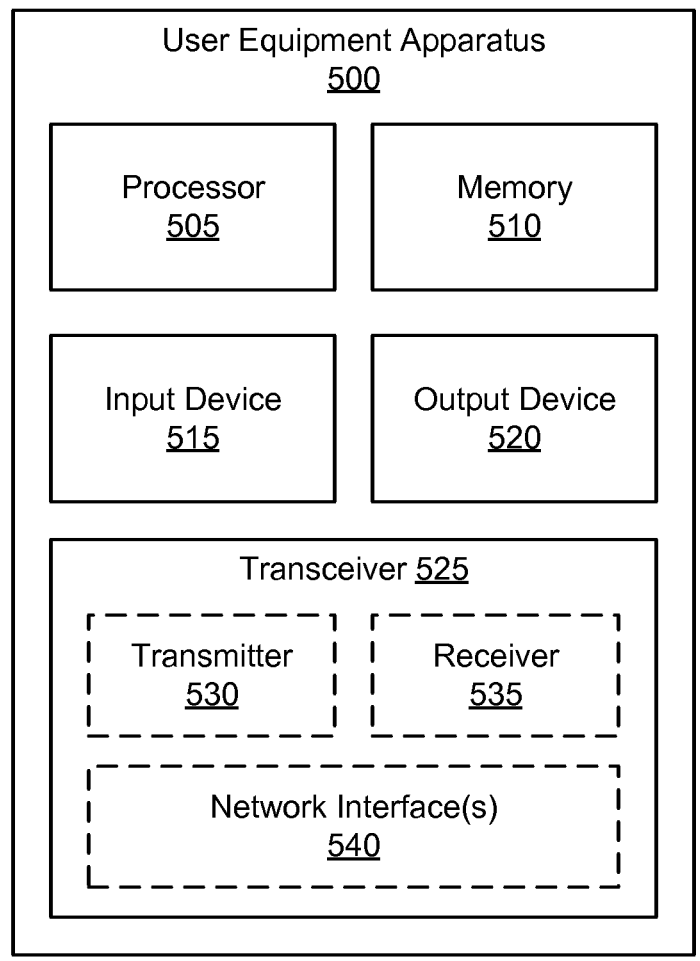
FIG. 5 is a schematic block diagram illustrating one embodiment of a user equipment apparatus for measuring RTT.

FIG. 5 depicts one embodiment of a user equipment apparatus 500 that may be used for measuring RTT, according to embodiments of the disclosure. The user equipment apparatus 500 may be one embodiment of the remote unit 105. Furthermore, the user equipment apparatus 500 may include a processor 505, a memory 510, an input device 515, an output device 520, a transceiver 525. In some embodiments, the input device 515 and the output device 520 are combined into a single device, such as a touch screen. In certain embodiments, the user equipment apparatus 500 does not include any input device 515 and/or output device 520.

As depicted, the transceiver 525 includes at least one transmitter 530 and at least one receiver 535. Here, the transceiver 525 communicates with one or more non-3GPP access networks. Additionally, the transceiver 525 may support at least one network interface 540. Here, the at least one network interface 540 facilitates communication with an eNB or gNB (e.g., using the "Uu" interface). Additionally, the at least one network interface 540 may include an interface used for communications with an UPF, an SMF, and/or a P-CSCF.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, the first transceiver 525, and the second transceiver 530.

In various embodiments, the processor 505 establishes a multi-access data connection with the mobile communication network, the multi-access data connection capable of communicating PDUs over the first access network and the second access network. The processor 505 establishes a measurement session via the multi-access data connection. For example, the measurement session may be established with a PMF in the mobile communication network. Establishing the measurement session may include the processor 505 sending a PMF-Start message to the PMF. In certain embodiments, the processor 505 establishes the measurement session in response to the set of provisioned traffic steering rules containing a rule that depends on the latency of the first access network and/or the latency of the second access network.

The processor 505 stores a first set of parameters for each PDU sent over the multi-access data connection. In various embodiments, the first set of parameters are stored in the memory 510. In certain embodiments, the first set of parameters are organized into a transmission table. The first set of parameters may include one or more of: a PDU ID, an access type, and a transmit time for each PDU sent on the multi-access data connection.

The processor 505 receives a first message via the measurement session. Here, the first message may be a PMF-Ack. The first message (PMF-Ack) includes a PDU ID which identifies a PDU that was sent by the apparatus over the multi-access data connection. Note that the received PDU ID matches one of the entries in the transmission table. In certain embodiments, the PDU ID is a unique value over a certain time period, such as a 30 second time window.

In certain embodiments, the PMF-Ack is not sent for every UL PDU, but rather is sent by the network PMF at a certain frequency (e.g., every X seconds or after every N uplink PDUs). In response to the PMF-Ack, the processor 505 may clean up the transmission table by deleting entries in the transmission table that are associated with the access network on which the first message is received and have earlier transmit times than a PDU indicated in the first message.

The processor 505 calculates an RTT value based on the first message (PMF-Ack) and the first set of parameters. Here, the processor 505 may determine a receive time ("RxT") of the PMF-Ack and look up a transmit time ("TxT") for the PDU identified in the PMF-Ack. The RTT is calculated using the RxT and the TxT; for example, the RTT may be equal to the difference between the RxT and TxT. This calculated RTT may be referred to as an "instantaneous" RTT. Note that the calculated RTT (instantaneous RTT) is associated with a certain access network. In various embodiments, the processor 505 maintains an average RTT for each access network. Accordingly, for every received Ack on one access network, the processor 505 calculates an RTT value (instantaneous RTT) and uses this value to update the average RTT value for this access network.

In further embodiments, the processor 505 may maintain separate RTT averages for a plurality of QoS data flows. Here, the first set of parameters also includes a QFI for a QoS Flow associated with the PDU. Upon receiving a PMF-Ack and calculating the (instantaneous) RTT, the processor 505 identifies the QoS flow to which the PDU belongs and updates the average RTT for this QoS flow.

For example, the processor 505 may receive a sequence of PMF-Ack messages over the first access (e.g., associated with a first QFI), denoted as 'PMF-Ack(1),' 'PMF-Ack(2),' 'PMF-Ack(3),' etc. Every time a PMF-Ack is received, the processor 505 calculates an instantaneous round-trip time value associated with this PMF-Ack, denoted as 'rtt'. Here, rtt=time when PMF-Ack was received−time when the associated PDU was transmitted. The processor 505 then uses 'rtt' to update the average round trip time for the first access (denoted as 'RTT').

In one embodiment, the (average) RTT is the "cumulated moving average" of the round trip time of the first access. Here, after PMF-Ack(1), the RTT=rtt. After PMF-Ack(2), the RTT=(RTT+rtt)/2. After PMF-Ack(3) the RTT=(2*RTT+rtt)/3. After PMF-Ack(4) the RTT=(3*RTT+rtt)/4. In general, After PMF-Ack(n+1), $RTT_{NEW}=(n*RTT_{OLD}+rtt)/(n+1)$. In other embodiments, the processor 505 may use other types of averaging to calculate the (average) RTT, such as a "weighted moving average" where recent rtt values have a bigger weight than older rtt values.

In certain embodiments, the processor 505 determines to which of the first and second access networks PDUs of the multi-access data connection are to be sent, said determination based on the calculated RTT value and a set of provisioned traffic steering rules. In one embodiment, the traffic steering rules are "ATSSS rules" sent by a 3GPP core network. Here, at least one traffic steering rule (e.g., ATSSS rule) indicates a preferred access for a PDU data flow that depends on the (average) RTT value. One example of such a rule is: "send IMS voice traffic to the access with the smallest delay," where the access with the smallest delay is the access with the smallest RTT value. Accordingly, determining to which of the first and second access networks PDUs of the multi-access data connection are to be sent may be based on the average RTT value for the first access network, the average RTT value for the second access network, and the set of provisioned traffic steering rules.

In some embodiments, the user equipment apparatus 500 is configured to share the RTT values for each access network (and/or each QoS flow) with the mobile communication network. In such embodiments, the processor 505 may control the transceiver 525 to send to the PMF an average RTT value associated with the first access network and an average RTT value associated with the second access network. In one embodiment, the processor 505 makes regular (e.g., periodic) reports of the (e.g., average) RTT values for each access network (and/or each QoS flow). In other embodiments, the processor 505 may send initial (e.g., average) RTT values for each access network (and/or each QoS flow) and then update these RTT values whenever the new RTT values deviate from the previously sent RTT values by a predetermined amount. Here, the predetermined amount may be the same for all access networks/QoS flows, or each access network (and/or QoS flow) may be associated with its own amount.

Note that the above RTT values remain valid whenever there is a steady flow of PDUs on the measured access network. In some embodiments, the processor 505 initiates a first access inactivity timer for the first access network and a second access inactivity timer for the second access network. Here, the processor 505 may reset each access inactivity timer in response to sending a PDU over an access network associated with the timer. In response to expiration of one of the inactivity timers, the processor 505 controls the transceiver 525 sends a measurement ping message (e.g., sends a PMF-Echo Request) over an access network associated with the expired timer. The transceiver 525 receives a response to the measurement ping message (e.g., receives a PMF-Echo Response), wherein the processor calculates an RTT value for the access network associated with the expired timer based on the response to the ping message.

In various embodiments, the processor 505 receives downlink PDUs over one of the first and second access networks. At a certain frequency, the processor 505 derives a PDU ID from the received downlink PDU, generates an acknowledgement message ("PMF-Ack") that contains the PDU ID, and sends the PMF-Ack over the access network on which the downlink PDU was received. The frequency may be based on the tracked number of received PDUs but may also be based on time (send an PMF-Ack once every 10 s). In one embodiment, the processor 505 generates acknowledgement messages associated with the first access network according to a first frequency and generates acknowledgement messages associated with the second access network according to a second frequency. In another embodiment, the processor 505 tracks a number of PDUs received on each access network, wherein generating the acknowledgement message occurs in response to a tracked number of received PDUs for the access network on which the downlink PDU was received exceeding a threshold number.

In various embodiments, the processor 505 establishes a data connection capable of communicating PDUs over the access network and establishes a measurement session via the data connection (e.g., with the PMF 147). The measurement session may be established with a PMF in a mobile communication network. The processor 505 stores a first set of parameters for each PDU sent over the data connection. At some point in time, the processor 505 receives a first message via the measurement session calculates an RTT value based on the first message and the first set of parameters. Here, the calculated RTT is used to update an (average) RTT value for the access network.

In certain embodiments, the first set of parameters are stored in a transmission table. Additionally, the processor 505 further deletes one or more entries in the transmission table in response to receiving the first message. Here, the deleted one or more entries are those with earlier transmit times than a PDU indicated in the first message.

In some embodiments, the first set of parameters includes a PDU identity and a transmit time for each PDU sent on the data connection. In certain embodiments, the first set of parameters further includes a quality of service flow identifier, wherein the processor calculates an RTT value associated with a specific quality of service data flow. In this case, the processor 505 may maintain many RTT values for the access network, e.g., RTT-1 for the QoS flow-1, RTT-2 for the QoS flow-2, etc. In certain embodiments, the processor 505 derives the PDU identity from header information contained in the PDU.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media. In some embodiments, the memory 510 stores data relating to measuring RTT, for example storing a transmission table, and the like. In certain embodiments, the memory 510 also stores program code and related data, such as an operating system ("OS") or other controller algorithms operating on the user equipment apparatus 500 and one or more software applications.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, may include any known electronically controllable display or display device. The output device 520 may be designed to output visual, audible, and/or haptic signals. In some embodiments, the output device 520 includes an electronic display capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, all or portions of the output device 520 may be located near the input device 515.

As discussed above, the transceiver 525 communicates with one or more network functions of a mobile communication network via one or more access networks. The transceiver 525 operates under the control of the processor 505 to transmit messages, data, and other signals and also to receive messages, data, and other signals. For example, the processor 505 may selectively activate the transceiver (or portions thereof) at particular times in order to send and receive messages. The transceiver 525 may include one or more transmitters 530 and one or more receivers 535. In certain embodiments, the one or more transmitters 530 and/or the one or more receivers 535 may share transceiver hardware and/or circuitry. For example, the one or more transmitters 530 and/or the one or more receivers 535 may share antenna(s), antenna tuner(s), amplifier(s), filter(s), oscillator(s), mixer(s), modulator/demodulator(s), power supply, and the like.

In various embodiments, the transceiver 525 is configured to communication with 3GPP access network(s) 120 and the non-3GPP access network(s) 130. In some embodiments, the transceiver 525 implements modem functionality for the 3GPP access network(s) 120 and/or the non-3GPP access network(s) 130. In one embodiment, the transceiver 525 implements multiple logical transceivers using different communication protocols or protocol stacks, while using common physical hardware. For example, the transceiver 525 may include one application-specific integrated circuit ("ASIC") which includes the function of first transceiver and second transceiver for accessing different networks. In other embodiments, the transceiver 525 comprises separate transceivers for the 3GPP access network(s) and for the non-3GPP access network(s).

Figure 6:
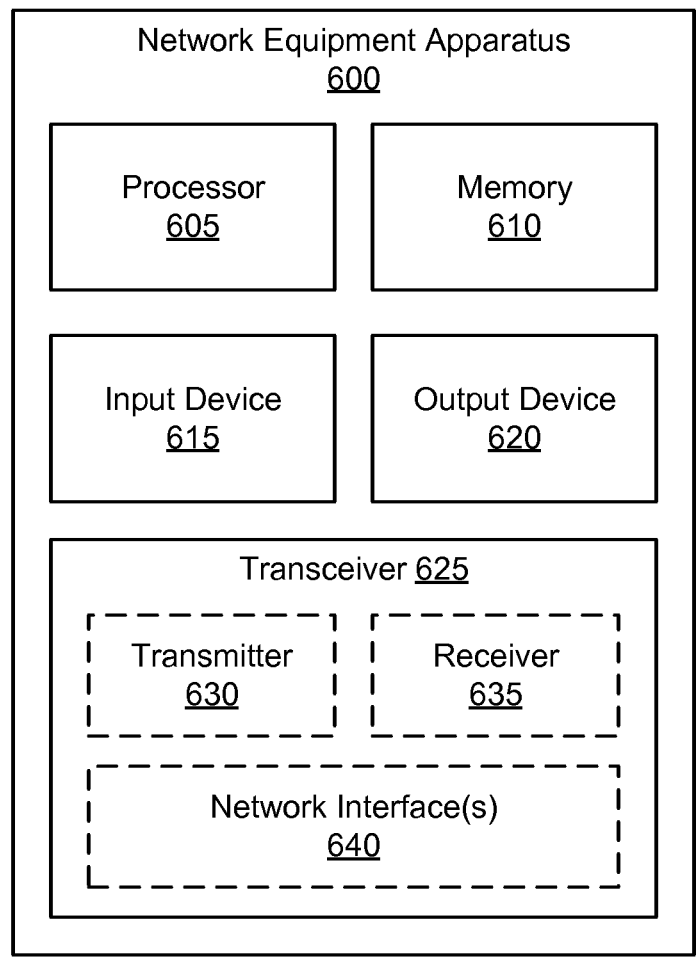
FIG. 6 is a schematic block diagram illustrating one embodiment of a network equipment apparatus for measuring RTT.

FIG. 6 depicts one embodiment of a network equipment apparatus 600 that may be used for measuring RTT, according to embodiments of the disclosure. The network equipment apparatus 600 may be one embodiment of a PMF, such as the PMF 147 and/or the PMF 230. Furthermore, network equipment apparatus 600 may include a processor 605, a memory 610, an input device 615, an output device 620, a transceiver 625. In some embodiments, the input device 615 and the output device 620 are combined into a single device, such as a touch screen. In certain embodiments, the network equipment apparatus 600 does not include any input device 615 and/or output device 620.

As depicted, the transceiver 625 includes at least one transmitter 630 and at least one receiver 635. Here, the transceiver 625 communicates with one or more remote units 105 and with one or more interworking functions 135 that provide access to one or more PLMNs Additionally, the transceiver 625 may support at least one network interface 640. Here, the at least one network interface 640 facilitates communication with a UPF, such as the UPF-A 143.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, the first transceiver 625, and the second transceiver 630.

In various embodiments, the processor 605 establishes a data connection capable of communicating PDUs over the access network and establishes a measurement session via the data connection (e.g., with the PMF 147). The measurement session may be established with a PMF in a mobile communication network. The processor 605 stores a first set of parameters for each PDU sent over the data connection. At some point in time, the processor 605 receives a first message via the measurement session calculates an RTT value based on the first message and the first set of parameters. Here, the calculated RTT is used to update an (average) RTT value for the access network.

In certain embodiments, the first set of parameters are stored in a transmission table. Additionally, the processor 605 further deletes one or more entries in the transmission table in response to receiving the first message. Here, the deleted one or more entries are those with earlier transmit times than a PDU indicated in the first message.

In some embodiments, the first set of parameters includes a PDU identity and a transmit time for each PDU sent on the data connection. In certain embodiments, the first set of parameters further includes a quality of service flow identifier, wherein the processor 605 calculates an RTT value associated with a specific quality of service data flow. In this case, the processor 605 may maintain many RTT values for the access network, e.g. RTT-1 for the QoS flow-1, RTT-2 for the QoS flow-2, etc. In certain embodiments, the processor 605 derives the PDU identity from header information contained in the PDU.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media. In some embodiments, the memory 610 stores data relating to measuring RTT, for example storing a transmission table, and the like. In certain embodiments, the memory 610 also stores program code and related data, such as an operating system ("OS") or other controller algorithms operating on the network equipment apparatus 600 and one or more software applications.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, may include any known electronically controllable display or display device. The output device 620 may be designed to output visual, audible, and/or haptic signals. In some embodiments, the output device 620 includes an electronic display capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, all or portions of the output device 620 may be located near the input device 615.

As discussed above, the transceiver 625 may communicate with one or more remote units and/or with one or more interworking functions that provide access to one or more PLMNs. The transceiver 625 may also communicate with one or more network functions (e.g., in the mobile core network 140). The transceiver 625 operates under the control of the processor 605 to transmit messages, data, and other signals and also to receive messages, data, and other signals. For example, the processor 605 may selectively activate the transceiver (or portions thereof) at particular times in order to send and receive messages.

The transceiver 625 may include one or more transmitters 630 and one or more receivers 635. In certain embodiments, the one or more transmitters 630 and/or the one or more receivers 635 may share transceiver hardware and/or circuitry. For example, the one or more transmitters 630 and/or the one or more receivers 635 may share antenna(s), antenna tuner(s), amplifier(s), filter(s), oscillator(s), mixer(s), modulator/demodulator(s), power supply, and the like. In one embodiment, the transceiver 625 implements multiple logical transceivers using different communication protocols or protocol stacks, while using common physical hardware.

Figure 7:
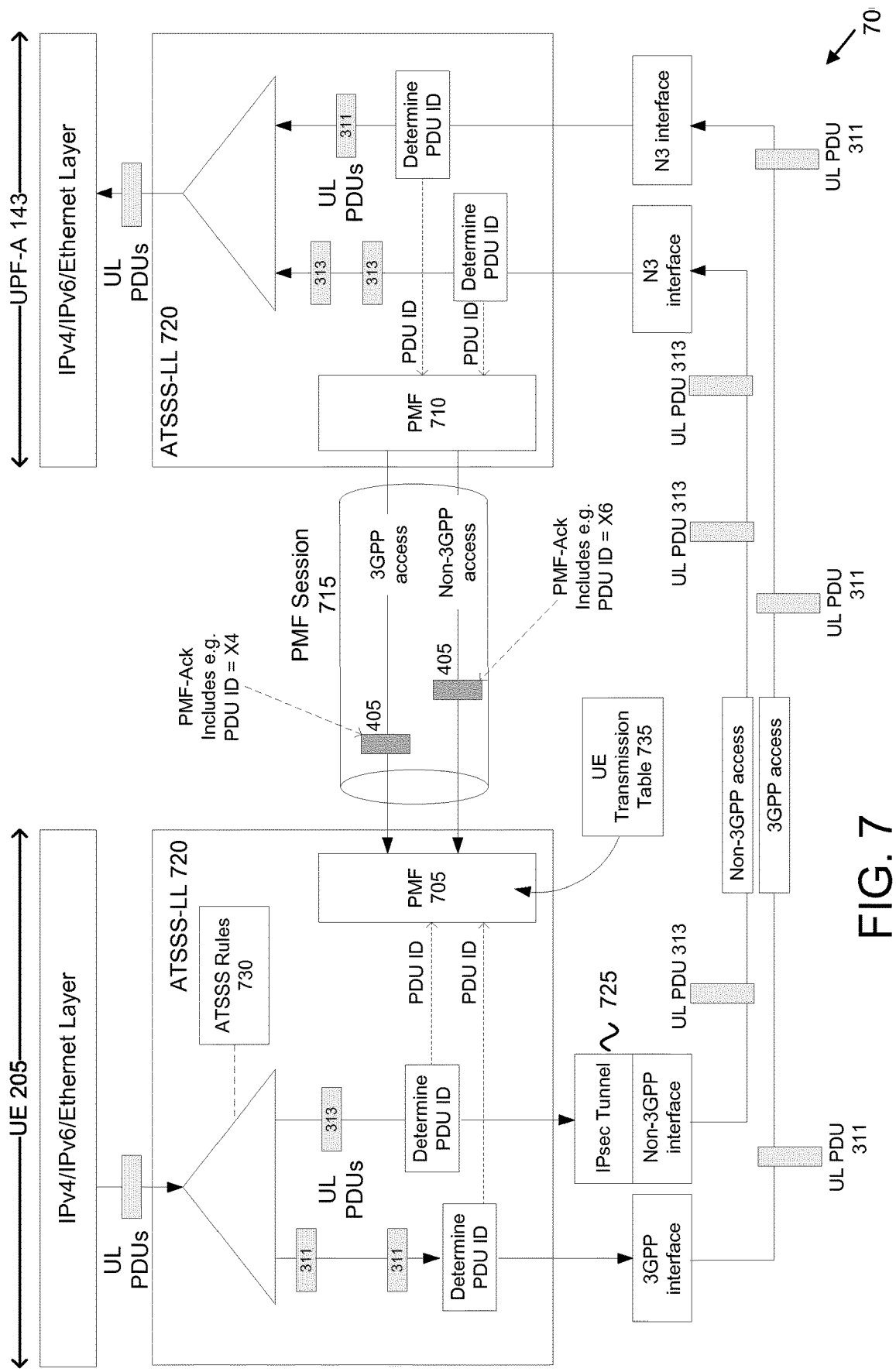
FIG. 7 is a block diagram illustrating one embodiment of an architecture for measuring RTT.

FIG. 7 depicts a first architecture 700 for measuring RTT of a MA-PDU session, according to embodiments of the disclosure. The first architecture 700 involves the UE 205 and the UPF-A 143. Again, the UPF-A 143 includes a PMF 147, depicted here as PMF 710. The UE 205 includes a PMF, here the PMF 705. After establishment of the MA-PDU, the PMF 705 and PMF 710 establish a PMF session 715. Note that the MA-PDU includes one data path over the 3GPP access and another data path over the non-3GPP access. Likewise, the PMF session 715 includes one data path over the 3GPP access and another data path over the non-3GPP access.

The first architecture 700 show using UL PDUs measure the RTT. The UL PDUs created by the UE 205 are typically IPv4 packets, or IPv6 packets, or Ethernet frames. Each PDU may encapsulate data provided by a UE application, or it may contain protocol control information (e.g. a TCP SYN or a TCP ACK). The ATSSS-Low Layer (ATSSS-LL) 720 represents the functionality in the UE 205 and in the UPF-A 143 that implements the traffic steering and the measurement method proposed above.

The IPsec Tunnel 725 represents the functional block in the UE 205 that implements GRE encapsulation and IPsec tunneling, as required for all traffic that traverses a non-3GPP access network. The other end of the IPsec tunnel exists in the interworking function 135 (e.g., N3IWF/TNGF), which is not shown in this figure.

The ATSSS-LL 720 in the UE 205 receives the UL PDUs from the upper layer, e.g. from the IPv4 or IPv6 or the Ethernet layer. Each PDU is steered either to 3GPP access or to non-3GPP access according with the provisioned ATSSS rules 730 in the UE 205. Before each PDU is sent for transmission, the UE 205 derives a PDU ID for this PDU and inserts it in a "UE transmission table" 735. One example of a "UE transmission table" 735 is described above with reference to FIG. 4. As discussed above, each entry in the UE transmission table 735 contains the PDU ID of the transmitted PDU (e.g. the destination IPv4 address and the IP checksum contained in the IPv4 header of the PDU), the Access Type which the PDU was transmitted on, and the time when the PDU was sent for transmission (Tx Time). In certain embodiments, the UE transmission table 735 may include a QFI for the PDU.

As shown in FIG. 7, the PDU ID derived for each UL PDU transmitted by the UE 205 can be provided to the PMF functionality in the UE 205 (e.g., PMF 705), which creates and maintains the UE transmission table 735. On the UPF side, the PDU ID derived for each UL PDU received by the UPF-A 143 can be provided to the PMF functionality (PMF 710) in the UPF-A 143, which decides whether an PMF-Ack message should be sent to the UE 205 with this PDU ID. Note that the PMF 705 in the UE 205 and the PMF 710 in the UPF-A 143 communicate via the PMF session 715, which has a 3GPP access path and a non-3GPP access path. The PMF-Ack messages sent on the 3GPP access path are associated with UL PDUs received by the UPF-A 143 via the 3GPP access path, and similarly for the non-3GPP access.

When the PMF functionality 705 in the UE 205 receives an PMF-Ack message containing a PDU ID, it looks up into the UE transmission table 735 to find the Tx Time for this PDU ID. It then calculates the RTT for this PDU (e.g., RTT=[Time when PMF-Ack was received]−[Tx Time of PDU]). Subsequently, the UE 205 cleans up the UE transmission table 735 by deleting all entries for PDU IDs that were transmitted before the PDU ID in the PMF-Ack message. This way, the UE 205 deletes the information for all PDUs which will never be acknowledged by the PMF 710. While FIG. 7, focuses only on the operation in the uplink direction (UE 205 sends traffic to UPF-A 143), the UPF-A 143 may calculate downlink RTT operation in the downlink direction using similar procedure.

Figure 8:
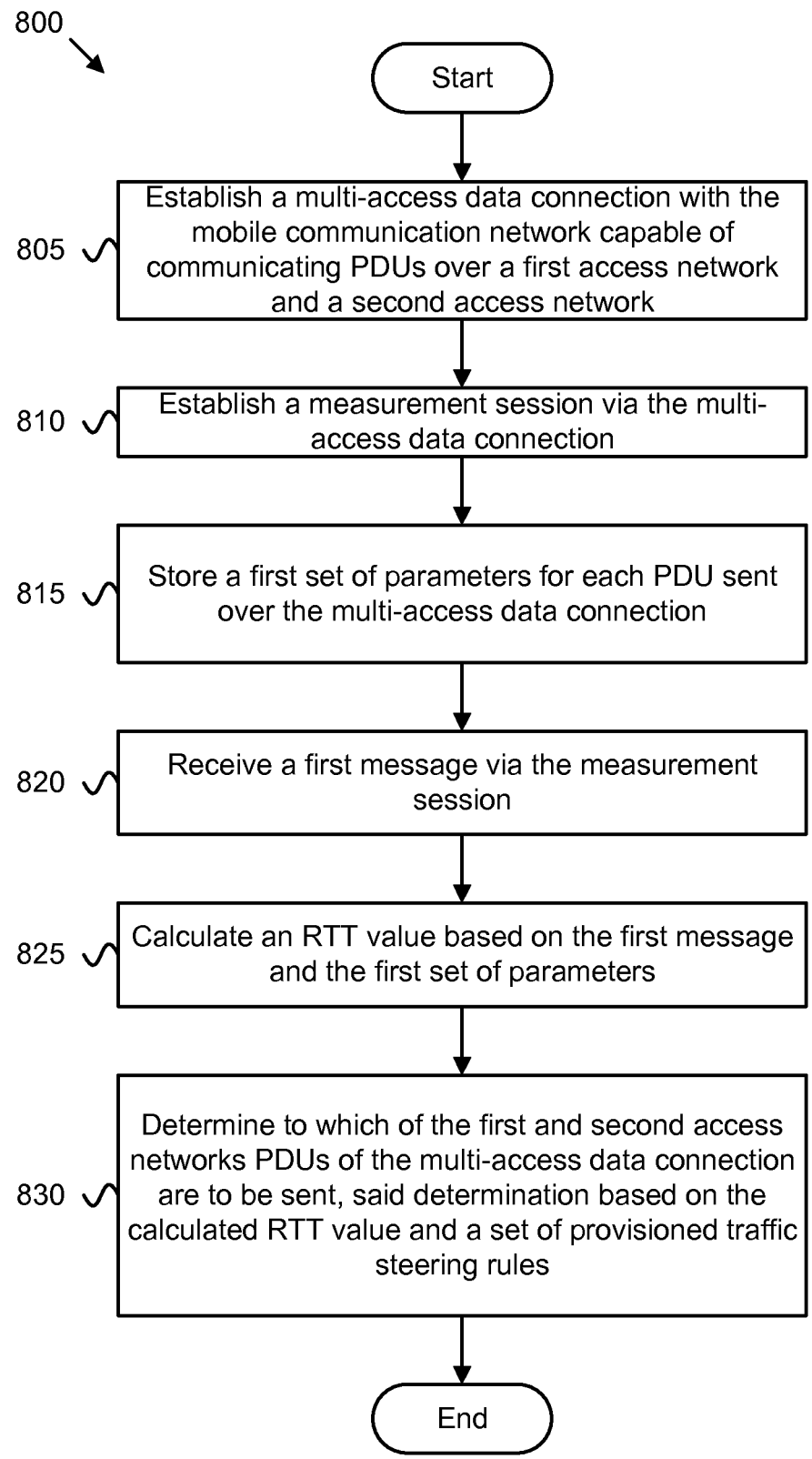
FIG. 8 is a flow chart diagram illustrating one embodiment of a first method for measuring RTT.

FIG. 8 depicts a method 800 for measuring RTT, according to embodiments of the disclosure. In some embodiments, the method 800 is performed by an apparatus, such as the remote unit 105, the UE 205, and/or the user equipment apparatus 500. In some embodiments, the method 800 may be performed by a PMF, such as the PMF 230, the PMF 705, and/or the PMF 905. In certain embodiments, the method 800 may be performed by a processor executing program code, for example, a microcontroller, a microprocessor, a CPU, a GPU, an auxiliary processing unit, a FPGA, or the like.

The method 800 begins and establishes 805 a multi-access data connection with a mobile communication network. Here, the multi-access data connection is capable of communicating PDUs over a first access network and a second access network. The method 800 includes establishing 810 a measurement session via the multi-access data connection.

The method 800 storing 815 a first set of parameters for each PDU sent over the multi-access data connection. The method 800 receiving 820 a first message via the measurement session. The method 800 calculating 825 an RTT value based on the first message and the first set of parameters.

The method 800 determining 830 to which of the first and second access networks PDUs of the multi-access data connection are to be sent, said determination based on the calculated RTT value and a set of provisioned traffic steering rules. The method 800 ends.

Figure 9:
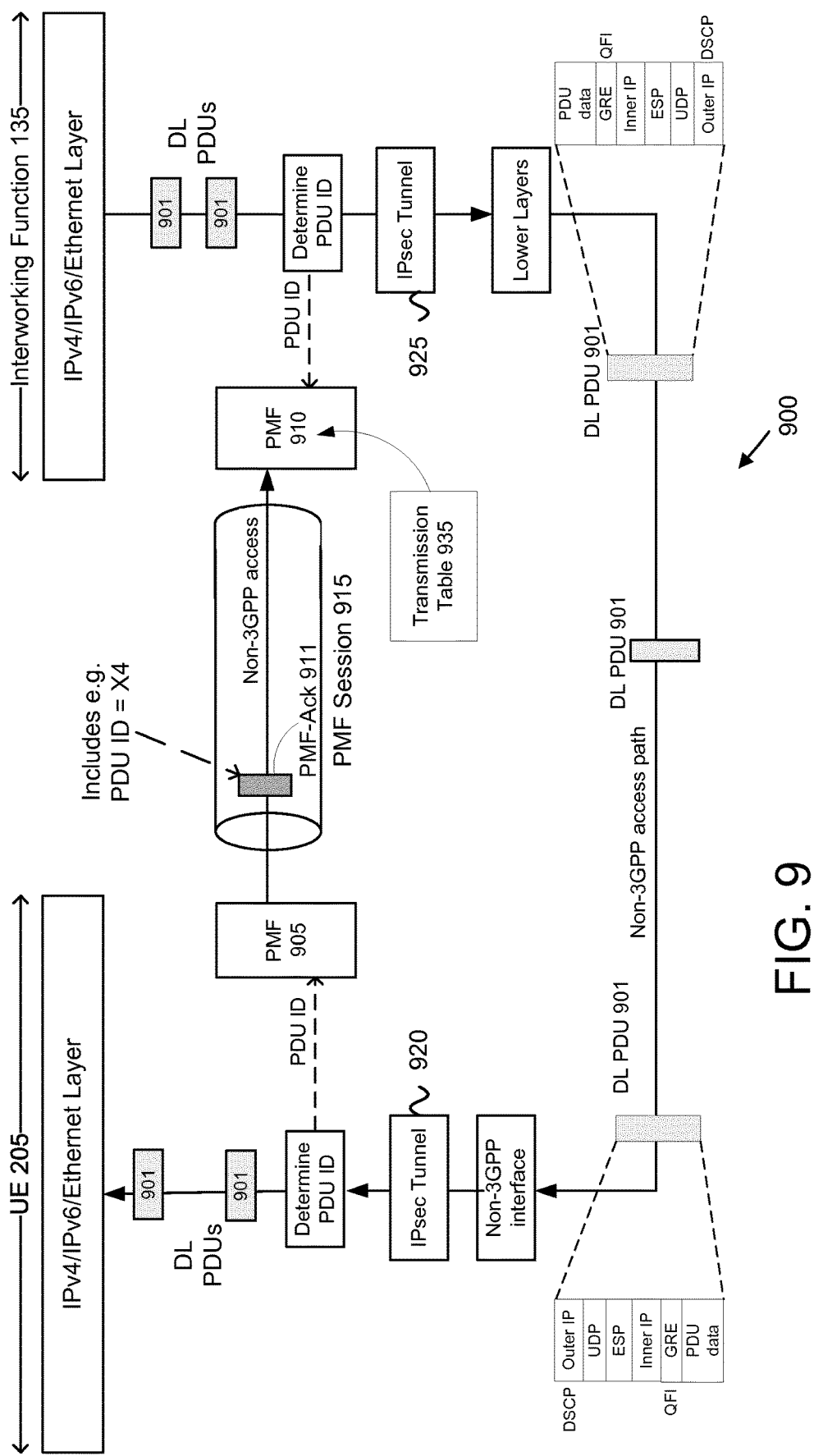
FIG. 9 is a block diagram illustrating another embodiment of an architecture for measuring RTT.

FIG. 9 depicts a second measurement architecture 900 for measuring the latency (e.g., average RTT) of a data connection, according to embodiments of the disclosure. The second architecture 900 involves the UE 205 and the interworking function 135. Here, the UE 205 includes a PMF 905 and the interworking function 135 includes a PMF 910. In one embodiment, the interworking function 135 is a TWIF. In another embodiment, the interworking function 135 is an N3IWF.

In the depicted embodiments, the data connection is a PDU session established over non-3GPP access. In other embodiments, the data connection may be another type of connection. Also, the data connection may be established over another access network type. After establishment of the data connection (e.g., PDU session), the PMF 905 and PMF 910 establish a PMF session 915.

The second architecture 900 shows using DL PDUs 901 measure the RTT. The DL PDUs 901 forwarded by the interworking function 135 are typically IPv4 packets, or IPv6 packets, or Ethernet frames. Each PDU may encapsulate data provided by a remote host, or it may contain protocol control information (e.g. a TCP SYN or a TCP ACK). The IPsec Tunnel 920 represents the functional block in the UE 205 that implements GRE encapsulation and IPsec tunneling, as required for all traffic that traverses a non-3GPP access network. The IPsec tunnel 925 represents the other end in the interworking function 135 (e.g., N3IWF/TNGF).

Before each DL PDU 901 is sent for transmission, the interworking function 135 derives a PDU ID for this PDU and inserts it in a transmission table 935. The transmission table 935 may be similar to the UE transmission tables described above. Here, each entry in the transmission table 935 contains the PDU ID of the transmitted PDU (e.g., a source or destination IPv4 address and the IP checksum contained in the IPv4 header of the PDU) and the time when the PDU was sent for transmission (Tx Time). In certain embodiments, the transmission table 935 may include a QFI for the PDU.

As shown in FIG. 9, the PDU ID derived for each DL PDU 901 transmitted by the UE 205 can be provided to the PMF 910 in the interworking function 135, which creates and maintains the transmission table 935. On the UE side, the PDU ID derived for each DL PDU 901 received by the UE 205 can be provided to the PMF 905 in the UE 205, which decides whether an PMF-Ack message 911 should be sent to the interworking function 135 with this PDU ID. Note that the PMF 910 in the interworking function 135 and the PMF 905 in the UE 205 communicate via the PMF session 915.

When the PMF functionality 910 in the interworking function 135 receives an PMF-Ack message 911 containing a PDU ID, it looks up into the transmission table 935 to find the Tx Time for this PDU ID. It then calculates the RTT for this PDU (e.g., RTT=[Time when PMF-Ack was received]−[Tx Time of PDU]). Subsequently, the interworking function 135 cleans up the transmission table 935 by deleting all entries for PDU IDs that were transmitted before the PDU ID in the PMF-Ack message 911. This way, the interworking function 135 deletes the information for all PDUs which will never be acknowledged by the PMF 905. While FIG. 7, focuses only on the operation in the downlink direction (interworking function 135 sends traffic to UE 205), the UE 205 may calculate downlink RTT operation in the uplink direction using similar procedure.

In certain embodiments, the second architecture 900 allows the interworking function 135 to determines if the DL PDUs 901 are transmitted within a pre-configured Packet Delay Budget (PDB). If the interworking function 135 determines, based on the measured RTT, that many DL PDUs 901 exceed their PDB (i.e. they are transmitted with a delay higher than a maximum delay), then the interworking function 135 can take several actions, e.g. it can inform the SMF in 5GC.

Note that the non-3GPP access path between the UE 205 and the interworking function 135 may be configured to support several QoS Flows, each one applying different QoS features and providing a different level of QoS. Each DL PDU is mapped by the UPF to a certain QoS Flow and it is, thus, transmitted by using the QoS features of this QoS Flow.

In order for a UPF to determine if a DL PDU 901 exceeds its PDB (which may be different for each QoS Flow), the UPF needs to store in its transmission table (e.g., a "UPF Transmission Table"), not only the PDU ID and the Tx Time, but also the QoS Flow Identity (QFI) associated with each transmitted DL PDU 901. This way, when the UPF receives an PMF-Ack 911, it can associate this PMF-Ack 911 with a DL PDU 901 that was transmitted before and with a certain QoS Flow. After that, it can determine if the DL PDU 901 exceeded its PDB. One example of a UPF transmission table is the transmission table 935.

Figure 10:
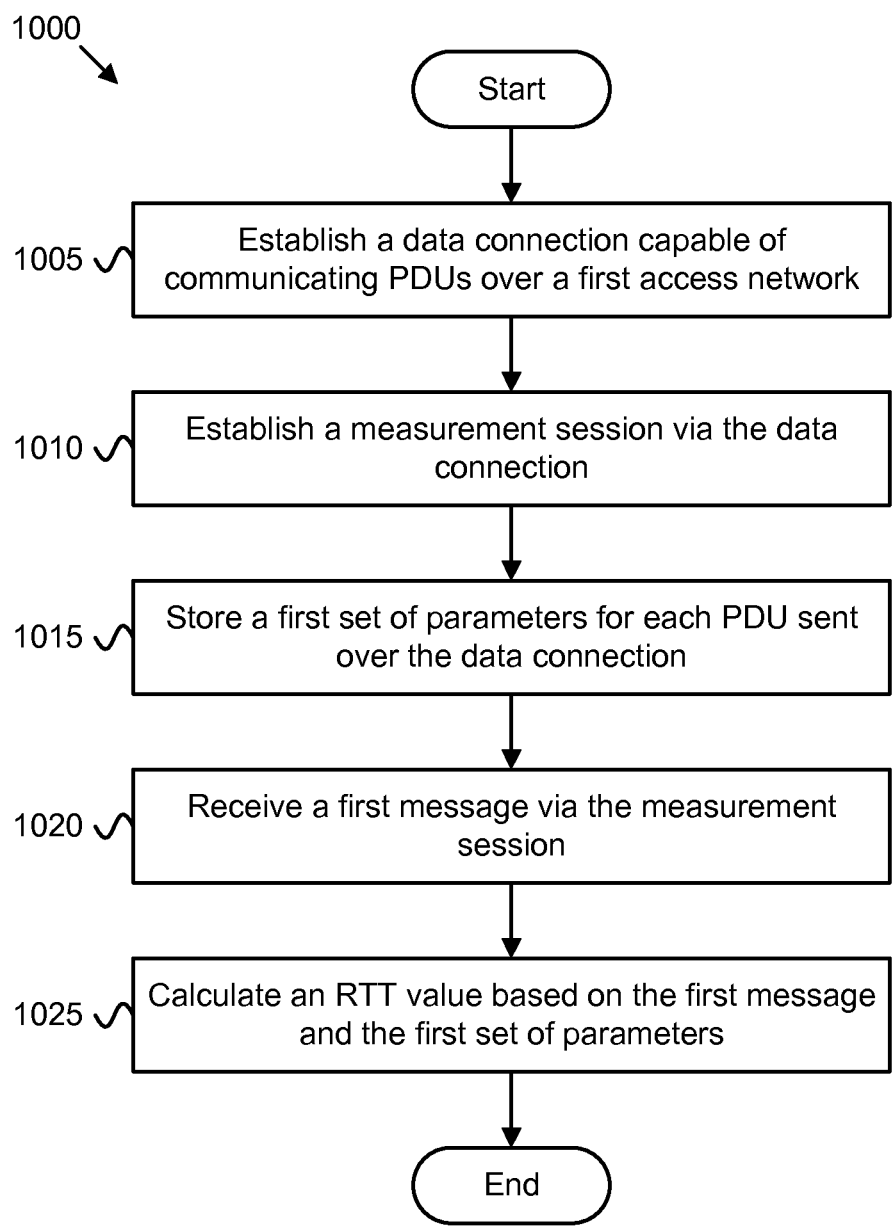
FIG. 10 is a flow chart diagram illustrating one embodiment of a second method for measuring RTT.

FIG. 10 depicts a method 1000 for measuring RTT, according to embodiments of the disclosure. In some embodiments, the method 1000 is performed by an apparatus, such as the remote unit 105, the UE 205, the user equipment apparatus 500, and/or the network equipment apparatus 600. In some embodiments, the method 1000 may be performed by a PMF, such as the PMF 147, the PMF 230, the PMF 705, the PMF 710, the PMF 905, and/or the PMF 910. In certain embodiments, the method 1000 may be performed by a processor executing program code, for example, a microcontroller, a microprocessor, a CPU, a GPU, an auxiliary processing unit, a FPGA, or the like.

The method 1000 begins and establishes 1005 a data connection capable of communicating PDUs over a first access network. The method 1000 includes establishing 1010 a measurement session via the data connection.

The method 1000 includes storing 1015 a first set of parameters for each PDU sent over the data connection. The method 1000 includes receiving 1020 a first message via the measurement session. Here, the first message corresponds to one of the PDUs sent on via the data connection. The method 1000 includes calculating 1025 an RTT value based on the first message and the first set of parameters. The method 1000 ends.

Disclosed herein is a first apparatus for measuring RTT. In various embodiments, the first apparatus may be a user terminal, such as the remote unit 105, the UE 205, and/or the user equipment apparatus 500. The first apparatus includes a processor and a transceiver that communicates with a mobile communication network via a first access network and a second access network. The processor establishes a multi-access data connection with the mobile communication network, the multi-access data connection capable of communicating PDUs over the first access network and the second access network and establishes a measurement session via the multi-access data connection. The processor stores a first set of parameters for each PDU sent over the multi-access data connection. The processor receives a first message via the measurement session and calculates an RTT value based on the first message and the first set of parameters. The processor determines to which of the first and second access networks PDUs of the multi-access data connection are to be sent, said determination based on the calculated RTT value and a set of provisioned traffic steering rules.

In various embodiments, the first message is received via one of the first access network and the second access network, wherein the processor calculates an RTT value associated with the access network on which the first message is received. In certain embodiments, the first set of parameters is stored in a transmission table, wherein the processor further deletes one or more entries in the transmission table in response to receiving the first message. In such embodiments, the deleted one or more entries are associated with the access network on which the first message is received and have earlier transmit times than a PDU indicated in the first message.

In some embodiments, the processor updates one of an average RTT value for the first access network and an average RTT value the second access network using the calculated RTT value. In such embodiments, determining to which of the first and second access networks PDUs of the multi-access data connection are to be sent is based on the average RTT value for the first access network, the average RTT value for the second access network, and the set of provisioned traffic steering rules.

In various embodiments, the first set of parameters includes a PDU identity, an access type, and a transmit time for each PDU sent on the multi-access data connection. In one embodiment, the PDU identity is derived from header information contained in the PDU. In another embodiment, the PDU identity is derived by one of: hashing at least a portion of the PDU data; and generating a checksum value from at least a portion of the PDU data. In certain embodiments, the first set of parameters further includes a quality of service flow identifier. In such embodiments, the processor calculates an RTT value associated with a specific quality of service data flow and with the access network on which the first message is received.

In some embodiments, the measurement session is established with a PMF in the mobile communication network. In certain embodiments, the processor controls the transceiver to send to the PMF an average RTT value associated with the first access network and an average RTT value associated with the second access network. In certain embodiments, the processor sends to the PMF an average RTT value in response to the average RTT value deviating from a previously sent average RTT value by a predetermined amount.

In some embodiments, the processor initiates a first access inactivity timer for the first access network and a second access inactivity timer for the second access network, wherein the processor resets each access inactivity timer in response to sending a PDU over an access network associated with the timer, wherein the transceiver sends a measurement ping message in response to expiration of one of the first and second inactivity timers, the measurement ping message sent over an access network associated with the expired timer. In such embodiments, the transceiver receives a response to the measurement ping message, wherein the processor calculates an RTT value for the access network associated with the expired timer based on the response to the measurement ping message.

In some embodiments, the processor establishes the measurement session in response to the set of provisioned traffic steering rules containing a rule that depends on at least one of: the latency of the first access network and the latency of the second access network. In various embodiments, the transceiver receives a downlink PDU over one of the first and second access networks. In such embodiments, the processor may derive a PDU ID from the received downlink PDU, generate an acknowledgement message that contains the PDU ID, and send the acknowledgement message over the access network on which the downlink PDU was received.

In certain embodiments, the downlink PDU is one of a plurality of PDUs received over one of the first and second access networks, wherein the processor generates acknowledgement messages associated with the first access network according to a first frequency and generates acknowledgement messages associated with the second access network according to a second frequency. In certain embodiments, the downlink PDU is one of a plurality of PDUs received over one of the first and second access networks, wherein the processor tracks a number of PDUs received on each access network, wherein generating the acknowledgement message occurs in response to a tracked number of received PDUs for the access network on which the downlink PDU was received exceeding a threshold number.

Disclosed herein is a first method for measuring RTT. In various embodiments, the first method is performed by a UE, such as the remote unit 105, the UE 205, and/or the user equipment apparatus 500. The first method includes establishing a multi-access data connection with a mobile communication network, the multi-access data connection capable of communicating PDUs over a first access network and a second access network. The first method includes establishing a measurement session via the multi-access data connection. The first method includes storing a first set of parameters for each PDU sent over the multi-access data connection. The first method includes receiving a first message via the measurement session. The first method includes calculating an RTT value based on the first message and the first set of parameters. The first method includes determining to which of the first and second access networks PDUs of the multi-access data connection are to be sent, said determination based on the calculated RTT value and a set of provisioned traffic steering rules.

In various embodiments, the first message is received via one of the first access network and the second access network. In such embodiments, calculating the RTT value based on the first message includes calculating an RTT value associated with the access network on which the first message is received. In some embodiments, the first set of parameters is stored in a transmission table. Here, the first method may also include deleting one or more entries in the transmission table in response to receiving the first message, wherein the deleted one or more entries are associated with the access network on which the first message is received and have earlier transmit times than a PDU indicated in the first message.

In some embodiments, the first method includes updating one of an average RTT value for the first access network and an average RTT value of the second access network using the calculated RTT value. In such embodiments, determining to which of the first and second access networks PDUs of the multi-access data connection are to be sent is based on the average RTT value for the first access network, the average RTT value for the second access network, and the set of provisioned traffic steering rules.

In some embodiments, the first set of parameters includes a PDU identity, an access type, and a transmit time for each PDU sent on the multi-access data connection. In certain embodiments, the PDU identity is derived from header information contained in the PDU. In certain embodiments, the PDU identity is derived by one of: hashing at least a portion of the PDU data and generating a checksum value from at least a portion of the PDU data.

In some embodiments, the first set of parameters further includes a quality of service flow identifier. In such embodiments, calculating the RTT value based on the first message includes calculating an RTT value associated with a specific quality of service data flow and with the access network on which the first message is received.

In various embodiments, the measurement session is established with a PMF in the mobile communication network, wherein the RTT value is sent to the PMF. In certain embodiments, the first method further includes sending to the PMF an average RTT value associated with the first access network and an average RTT value associated with the second access network. In certain embodiments, sending to the PMF an average RTT value occurs in response to the average RTT value deviating from a previously sent average RTT value by a predetermined amount. In some embodiments, establishing the measurement session occurs in response to the set of provisioned traffic steering rules containing a rule that depends on at least one of: the latency of the first access network and the latency of the second access network.

In some embodiments, the first method includes initiating a first access inactivity timer for the first access network and a second access inactivity timer for the second access network and resetting each access inactivity timer in response to sending a PDU over an access network associated with the timer. Here, the first method includes sending a measurement ping message in response to expiration of one of the first and second inactivity timers, the measurement ping message sent over an access network associated with the expired timer. In certain embodiments, the first method includes receiving a response to the measurement ping message and calculating an RTT value for the access network associated with the expired timer based on the response to the measurement ping message.

In some embodiments, the first method includes receiving a downlink PDU over one of the first and second access networks and deriving a PDU ID from the received downlink PDU. Here, the first method includes generating an acknowledgement message that contains the PDU ID and sending the acknowledgement message over the access network on which the downlink PDU was received.

In certain embodiments, the downlink PDU is one of a plurality of PDUs received over one of the first and second access networks. In such embodiments, the first method further includes generating acknowledgement messages associated with the first access network according to a first frequency and generating acknowledgement messages associated with the second access network according to a second frequency. In certain embodiments, the downlink PDU is one of a plurality of PDUs received over one of the first and second access networks. In such embodiments, the first method further includes tracking a number of PDUs received on each access network, wherein generating the acknowledgement message occurs in response to a tracked number of received PDUs for the access network on which the downlink PDU was received exceeding a threshold number.

Disclosed herein is a first apparatus for measuring RTT. In various embodiments, the first apparatus may be a user terminal, such as the remote unit 105, the UE 205, and/or the user equipment apparatus 500. In certain embodiments, the first apparatus may be a PMF, such as the PMF 147, the PMF 230, the PMF 705, the PMF 710, the PMF 905, and/or the PMF 910. In other embodiments, the first apparatus is the network equipment apparatus 600.

The first apparatus includes a processor and a transceiver that communicates via an access network. The processor establishes a data connection capable of communicating PDUs over the access network and establishes a measurement session via the data connection. The processor stores a first set of parameters for each PDU sent over the data connection. The processor receives (via the transceiver) a first message via the measurement session and calculates an RTT value based on the first message and the first set of parameters.

In certain embodiments, the processor updates an average RTT value for the access network using the calculated RTT value. In some embodiments, the first set of parameters is stored in a transmission table. In such embodiments, the processor may further delete one or more entries in the transmission table in response to receiving the first message, wherein the deleted one or more entries have earlier transmit times than a PDU indicated in the first message.

In certain embodiments, the measurement session is established between a user equipment and a PMF in a mobile communication network. In such embodiments, the processor may send the RTT value to the PMF via the transceiver. In one embodiment, the processor sends to the PMF an average RTT value associated with the first access network and an average RTT value associated with the second access network. In another embodiment, the processor sends to the PMF an average RTT value in response to the average RTT value deviating from a previously sent average RTT value by a predetermined amount.

In some embodiments, the first set of parameters includes a PDU identity and a transmit time for each PDU sent on the data connection. In certain embodiments, the first set of parameters further includes a quality of service flow identifier, wherein the processor calculates an RTT value associated with a specific quality of service data flow. In certain embodiments, the PDU identity is derived from header information contained in the PDU.

Disclosed herein is a second method for measuring RTT. In various embodiments, the second method is performed by a UE, such as the remote unit 105, the user equipment apparatus 500. In certain embodiments, the second method is performed by a PMF, such as the PMF 147, the PMF 230, the PMF 705, the PMF 710, the PMF 905, and/or the PMF 910. In other embodiments, the second method is performed by the network equipment apparatus 600.

The second method includes establishing a data connection capable of communicating PDUs over an access network and establishing a measurement session via the data connection. The second method includes storing a first set of parameters for each PDU sent over the data connection. The second method includes receiving a first message via the measurement session and calculating an RTT value based on the first message and the first set of parameters.

In certain embodiments, the second method includes updating an average RTT value for the access network using the calculated RTT value. In some embodiments, the first set of parameters is stored in a transmission table. In such embodiments, the second method may further include deleting one or more entries in the transmission table in response to receiving the first message, wherein the deleted one or more entries have earlier transmit times than a PDU indicated in the first message.

In some embodiments, the measurement session is established between a user equipment and a PMF in a mobile communication network, wherein the RTT value is sent to the PMF. In one embodiment, the first method further includes sending to the PMF an average RTT value associated with the first access network and an average RTT value associated with the second access network. In certain embodiments, sending to the PMF the average RTT value occurs in response to the average RTT value deviating from a previously sent average RTT value by a predetermined amount.

In some embodiments, the first set of parameters includes a PDU identity and a transmit time for each PDU sent on the data connection. In certain embodiments, the first set of parameters further includes a quality of service flow identifier. In such embodiments, calculating the RTT value based on the first message includes calculating an RTT value associated with a specific quality of service data flow. In certain embodiments, the PDU identity is derived from header information contained in the PDU.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE) for wireless communication, comprising:
    at least one memory; and
    at least one processor coupled with the at least one memory and configured to cause the UE to:
        establish a multi-access data connection with a mobile communication network for communicating a plurality of protocol data units (PDUs) over a first access network and a second access network;
        establish a measurement session via the multi-access data connection, wherein the measurement session comprises a connection to a measurement function in the mobile communication network, the connection comprising a transmission control protocol (TCP) connection or a user datagram protocol (UDP) association;
        store a table of parameters associated with the plurality of PDUs communicated over the multi-access data connection, each entry of the table of parameters corresponding to a respective PDU of the plurality of PDUs, and each entry of the table comprising a first PDU identity, an access type associated with the respective PDU, and a transmit time;
        receive one or more acknowledgement messages via the measurement session, each acknowledgement message comprising a second PDU identity, wherein each acknowledgement message is associated with a receive time, and wherein the one or more acknowledgement messages correspond to a subset of the plurality of PDUs;
        determine, for each acknowledgement message and based on the second PDU identity, a respective PDU identity, a corresponding access type, and a corresponding transmit time in the table of parameters;
        delete one or more entries in the table of parameters associated with the corresponding access type and having respective transmit times earlier than the corresponding transmit time;
        calculate a round trip time (RTT) value for the corresponding access type based at least in part on the receive time associated with the acknowledgement message and the corresponding transmit time; and
        determine whether to communicate a subsequent PDU over the first access network or the second access network of the multi-access data connection, based at least in part on the calculated RTT value and a set of traffic steering rules.

2. The UE of claim 1, wherein the acknowledgement message is received via the first access network or the second access network, and wherein the at least one processor is configured to cause the UE to associate the calculated RTT value with the first access network or the second access network based at least in part on the corresponding access type of the acknowledgement message.

3. The UE of claim 1, wherein the at least one processor is configured to cause the UE to update a first average RTT value for the first access network or a second average RTT value the second access network using the calculated RTT value, and determine whether to communicate the subsequent PDU via the first access network or the second access network based on the first average RTT value for the first access network, the second average RTT value for the second access network, and the set of traffic steering rules.

4. The UE of claim 1, wherein the table of parameters further comprises a quality of service (QOS) flow identifier for each PDU of the plurality of PDUs communicated over the multi-access data connection, wherein the at least one processor is configured to cause the UE to associate the calculated RTT value with a QoS data flow and the first access network or the second access network based at least in part on whether the acknowledgement message is received via the first access network or via the second access network.

5. The UE of claim 1, wherein the first PDU identity is based at least in part on header information of a respective PDU.

6. The UE of claim 1, wherein the first PDU identity is based at least in part on a hash of at least a portion of data in a respective PDU or a checksum value based at least in part on at least a portion of the data.

7. The UE of claim 1, wherein the measurement function comprises a performance measurement functionality (PMF).

8. The UE of claim 7, wherein the at least one processor is configured to cause the UE to transmit, to the PMF, a first average RTT value associated with the first access network and a second average RTT value associated with the second access network.

9. The UE of claim 7, wherein the at least one processor is configured to cause the UE to transmit, to the PMF, a current average RTT value in response to an occurrence of a trigger, wherein the current average RTT value comprises a first average RTT value associated with the first access network or a second average RTT value associated with the second access network, and wherein the trigger is based at least in part on the current average RTT value deviating from a previously-communicated average RTT value by a predetermined amount.

10. The UE of claim 1, wherein the at least one processor is configured to cause the UE to establish the measurement session in response to the set of traffic steering rules containing a rule that depends on at least one of: a first latency of the first access network or a second latency of the second access network.

11. The UE of claim 1, wherein the at least one processor is configured to cause the UE to:
initiate a first inactivity timer for the first access network and a second inactivity timer for the second access network;
reset the first inactivity timer or the second inactivity timer, or both, in response to communicating the plurality of PDUs over the first access network or the second access network, or both; and
transmit a measurement ping message in response to an expiration of the first inactivity timer or the second inactivity timer, wherein the measurement ping message is transmitted over the first access network or the second access network based on the expiration of the first inactivity timer or the second inactivity timer.

12. The UE of claim 11, wherein the at least one processor is configured to cause the UE to:
receive a response to the measurement ping message; and
calculate a first RTT value for the first access network or a second RTT value for the second access network, or both, based on the expiration of the first inactivity timer or the second inactivity timer and based on the response to the measurement ping message.

13. The UE of claim 1, wherein the at least one processor is configured to cause the UE to:
receive a downlink PDU over the first access network or the second access network;
derive a third PDU identity from the received downlink PDU;
generate an acknowledgement message that contains the third PDU identity; and
transmit the acknowledgement message via the first access network or via the second access network based at least in part on whether the downlink PDU was received via the first access network or via the second access network.

14. The UE of claim 13, wherein the downlink PDU is one of a plurality of downlink PDUs received over the first access network or the second access network, and wherein the at least one processor is configured to cause the UE to:
generate a set of first acknowledgement messages associated with the first access network according to a first frequency; and
generate a set of second acknowledgement messages associated with the second access network according to a second frequency, wherein the generated acknowledgement message comprises a first acknowledgement message associated with the first access network or a second acknowledgement message associated with the first access network.

15. The UE of claim 13, wherein the downlink PDU is one of a plurality of downlink PDUs received over the first access network or the second access network, and wherein the at least one processor is configured to cause the UE to:
track a first number of downlink PDUs received the first access network;
track a second number of downlink PDUs received via the second access network; and
generate the acknowledgement message based at least in part on the first number of downlink PDUs satisfying a threshold number or the second number of downlink PDUs satisfying the threshold number.

16. A method performed by a user equipment (UE), the method comprising:
establishing a multi-access data connection with a mobile communication network for communicating a plurality of protocol data units (PDUs) over a first access network and a second access network;
establishing a measurement session via the multi-access data connection, wherein the measurement session comprises a connection to a measurement function in the mobile communication network, the connection comprising a transmission control protocol (TCP) connection or a user datagram protocol (UDP) association;
storing a table of parameters associated with the plurality of PDUs communicated over the multi-access data connection, each entry of the table of parameters corresponding to a respective PDU of the plurality of PDUs, and each entry of the table comprising a first PDU identity, an access type associated with the respective PDU, and a transmit time;
receiving one or more acknowledgement messages via the measurement session, each acknowledgement message comprising a second PDU identity, wherein each acknowledgement message is associated with a receive time, and wherein the one or more acknowledgement messages correspond to a subset of the plurality of PDUs;
determining, for each acknowledgement message and based on the second PDU identity, a respective PDU identity, a corresponding access type, and a corresponding transmit time in the table of parameters;
deleting one or more entries in the table of parameters associated with the corresponding access type and having respective transmit times earlier than the corresponding transmit time;
calculating a round trip time (RTT) value for the corresponding access type based at least in part on the receive time associated with the acknowledgment message and the corresponding transmit time; and
determining whether to communicate a subsequent PDU over the first access network or the second access network of the multi-access data connection, based at least in part on the calculated RTT value and a set of traffic steering rules.

17. An apparatus for wireless communication, comprising:
at least one memory; and
at least one processor coupled with the at least one memory and configured to cause the apparatus to:

establish a data connection for communicating a plurality of protocol data units (PDUs) over an access network;

establish a measurement session via the data connection, wherein the measurement session comprises a connection between a user equipment (UE) and a measurement function in a mobile communication network, the connection comprising a transmission control protocol (TCP) connection or a user datagram protocol (UDP) association;

store a table of parameters associated with the plurality of PDUs communicated over the data connection, each entry of the table of parameters corresponding to a respective PDU of the plurality of PDUs, and each entry of the table comprising a first PDU identity, an access type associated with the respective PDU, and a transmit time;

receive one or more acknowledgement messages via the measurement session, each acknowledgement message comprising a second PDU identity, wherein each acknowledgement message is associated with a receive time, and wherein the one or more acknowledgement messages correspond to a subset of the plurality of PDUs;

determine, for each acknowledgement message and based on the second PDU identity, a respective PDU identity, a corresponding access type, and a corresponding transmit time in the table of parameters;

delete one or more entries in the table of parameters associated with the corresponding access type and having respective transmit times earlier than the corresponding transmit time; and calculate a round trip time (RTT) value for the corresponding access type based at least in part on the receive time associated with the acknowledgement message and the corresponding transmit time.

18. The apparatus of claim 17, wherein the apparatus comprises the UE, and wherein the measurement function comprises a Performance Measurement Functionality (PMF) in the mobile communication network.

19. The apparatus of claim 17, wherein the apparatus comprises a Performance Measurement Functionality (PMF) in the mobile communication network.

* * * * *